US009178655B2

(12) United States Patent
Razzetti et al.

(10) Patent No.: US 9,178,655 B2
(45) Date of Patent: Nov. 3, 2015

(54) METHOD OF DECODING A DIFFERENTIALLY ENCODED PHASE MODULATED OPTICAL DATA SIGNAL

(75) Inventors: Luca Razzetti, Milan (IT); Carlo Costantini, Lecco (IT); Marianna Pepe, Milan (IT); Andreas Leven, Bietigheim-Bissingen (DE); Stephan Ten Brink, Stuttgart (DE); Laurent Schmalen, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 62 days.

(21) Appl. No.: 14/122,290

(22) PCT Filed: Jun. 15, 2012

(86) PCT No.: PCT/EP2012/061390
§ 371 (c)(1),
(2), (4) Date: Nov. 26, 2013

(87) PCT Pub. No.: WO2012/175411
PCT Pub. Date: Dec. 27, 2012

(65) Prior Publication Data
US 2014/0195878 A1    Jul. 10, 2014

(30) Foreign Application Priority Data

Jun. 21, 2011  (EP) .................................... 11305776

(51) Int. Cl.
*H03M 13/00* (2006.01)
*H04L 1/00* (2006.01)
*H04B 10/61* (2013.01)

(52) U.S. Cl.
CPC .......... *H04L 1/0045* (2013.01); *H04B 10/6165* (2013.01); *H04L 1/005* (2013.01); *H04L 1/0054* (2013.01); *H04L 1/0057* (2013.01)

(58) Field of Classification Search
None
See application file for complete search history.

(56) References Cited

U.S. PATENT DOCUMENTS 4,871,974 A   10/1989  Davis et al.
5,754,600 A    5/1998  Rahnema
(Continued)

FOREIGN PATENT DOCUMENTS

EP    0381636    1/1990
EP    1986352   10/2008
(Continued)

OTHER PUBLICATIONS

Adachi, F.; Reduced State Transition Viterbi Differential Detection of M-ary DPSK signals; Electronics Letters, IEE Stevenage, GB, vol. 32, No. 12, Jun. 6, 1996; pp. 1064-1066; XP006005218; ISSN: 0013-5194; DOI: 10.1049/EL:19960707.
(Continued)

*Primary Examiner* — Daniel McMahon
(74) *Attorney, Agent, or Firm* — Patti & Malvone Law Group, LLC

(57) ABSTRACT

Proposed is a method of decoding a differentially encoded PSK modulated optical data signal carrying FEC encoded data values. The optical signal is corrected by an estimated phase offset. From the corrected signal, respective likelihood values for the FEC encoded data values are derived, using an estimation algorithm which accounts for a differential encoding rule used for differentially encoding the optical signal. The derived likelihood values are limited to a predetermined range of values. From the limited likelihood values, FEC decoded data values are derived, using an algorithm which accounts for a FEC encoding rule used for FEC encoding the FEC encoded data values.

8 Claims, 19 Drawing Sheets

(56) References Cited

U.S. PATENT DOCUMENTS

| | | | |
|---|---|---|---|
| 6,246,730 B1 | 6/2001 | Ono | |
| 7,398,454 B2* | 7/2008 | Cai et al. | 714/780 |
| 8,090,269 B2* | 1/2012 | Toyoda et al. | 398/188 |
| 8,503,568 B1* | 8/2013 | Pheiffer et al. | 375/283 |
| 2005/0005225 A1* | 1/2005 | Johnson et al. | 714/758 |
| 2006/0136797 A1* | 6/2006 | Cai et al. | 714/752 |
| 2010/0205510 A1* | 8/2010 | von der Embse | 714/776 |
| 2012/0096327 A1* | 4/2012 | Cai | 714/752 |
| 2014/0016947 A1* | 1/2014 | Leven et al. | 398/208 |

FOREIGN PATENT DOCUMENTS

| | | |
|---|---|---|
| EP | 2506516 | 3/2011 |
| JP | H11196141 | 7/1999 |
| JP | 2001274855 | 10/2001 |
| JP | 2002314436 | 10/2002 |
| JP | 2006180505 | 7/2006 |
| WO | 2010078213 | 7/2010 |

OTHER PUBLICATIONS

Zhou, S. D. et al; Viterbi Decoder Without Carrier Recovery; Electronics Letters, IEE Stevenage, GB, vol. 32, No. 23, Nov. 7, 1996; pp. 2124-2125; XP006005966; ISSN: 0013-5194; DOI: 10.1049/EL:19961460.

Franceschini, M. et al; Serial concatenation of LDPC codes and differential modulations; IEEE Trans. Commun., IEEE Journal on Selected Areas in Communications; vol. 23, No. 9; pp. 1758-1768, Sep. 2005.

Bahl, L. R. et al; Optimal Decoding of Linear Codes for minimizing symbol error rate; IEEE Transactions on Information Theory; vol. IT-20(2); pp. 284-287, Mar. 1974.

Viterbi, A.J. et al; Nonlinear estimation of PSK-modulated carrier phase with application to burst digital transmission; IEEE Transaction on Information Theory, vol-IT-29; pp. 543-551; Jul. 1983.

Pfau, T. et al; Hardware-Efficient Coherent Digital Receiver Concept With Feedforward Carrier Recovery for M—QAM Constellations; Journal of Lightwave Technology, vol. 27, No. 8; pp. 989-999, Apr. 15, 2009.

Leven, A. et al; Frequency Estimation in Intradyne Reception; IEEE Photonics Technology Letters; IEEE, vol. 19, No. 6, Mar. 15, 2007; pp. 366-368.

D'Amico, A. et al; Efficient non-data-aided carrier and clock recovery for satellite DVB at very low signal-to-noise ratios; Selected Areas in Communications, IEEE Journal on, vol. 19, No. 12; pp. 2320-2330; Dec. 2001.

Mackay, D. et al; Exact Marginalization in Trellises; Information Theory, Inference, and Learning Algorithms; Cambridge University Press, Version 7.2, Mar. 28, 2003, Chapter 25, pp. 324 to 333.

Hagenauer, J. et al; Iterative Decoding of Binary Block and Convolutional Codes; IEEE Transactions on Information Theory; vol. 42, No. 2, Mar. 1996; pp. 429-445.

Kschischang, F. R. et al; Factor graphs and the sum-product algorithm; IEEE Transactions on Information Theory, vol. 47, No. 2, Feb. 2001; pp. 498-519.

Benedetto, S. et al; A Soft-Input Soft-Output App Module for Iterative Decoding of Concatenated Codes; IEEE Communications Letters, vol. 1, No. 1, Jan. 1997; pp. 22-24.

* cited by examiner

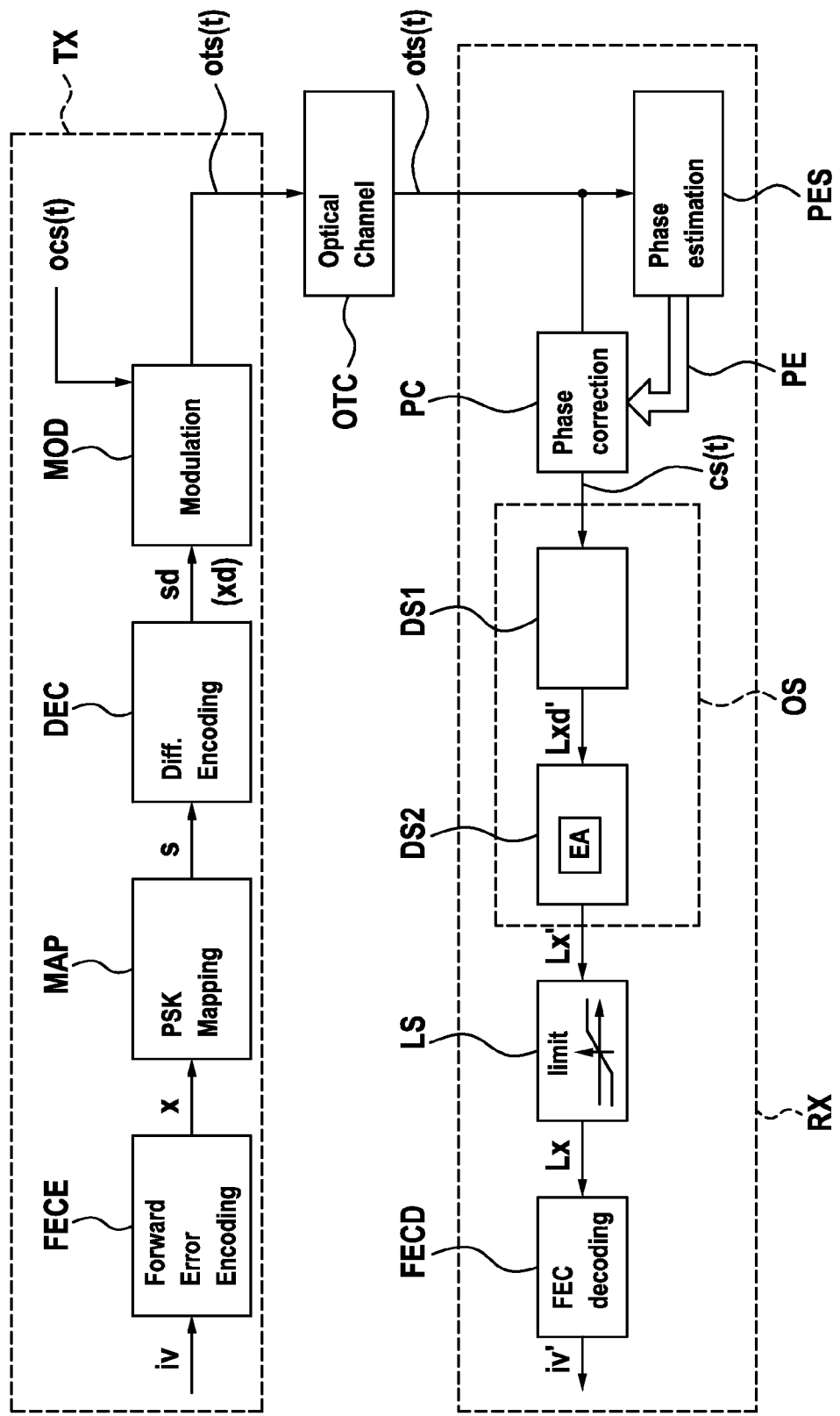

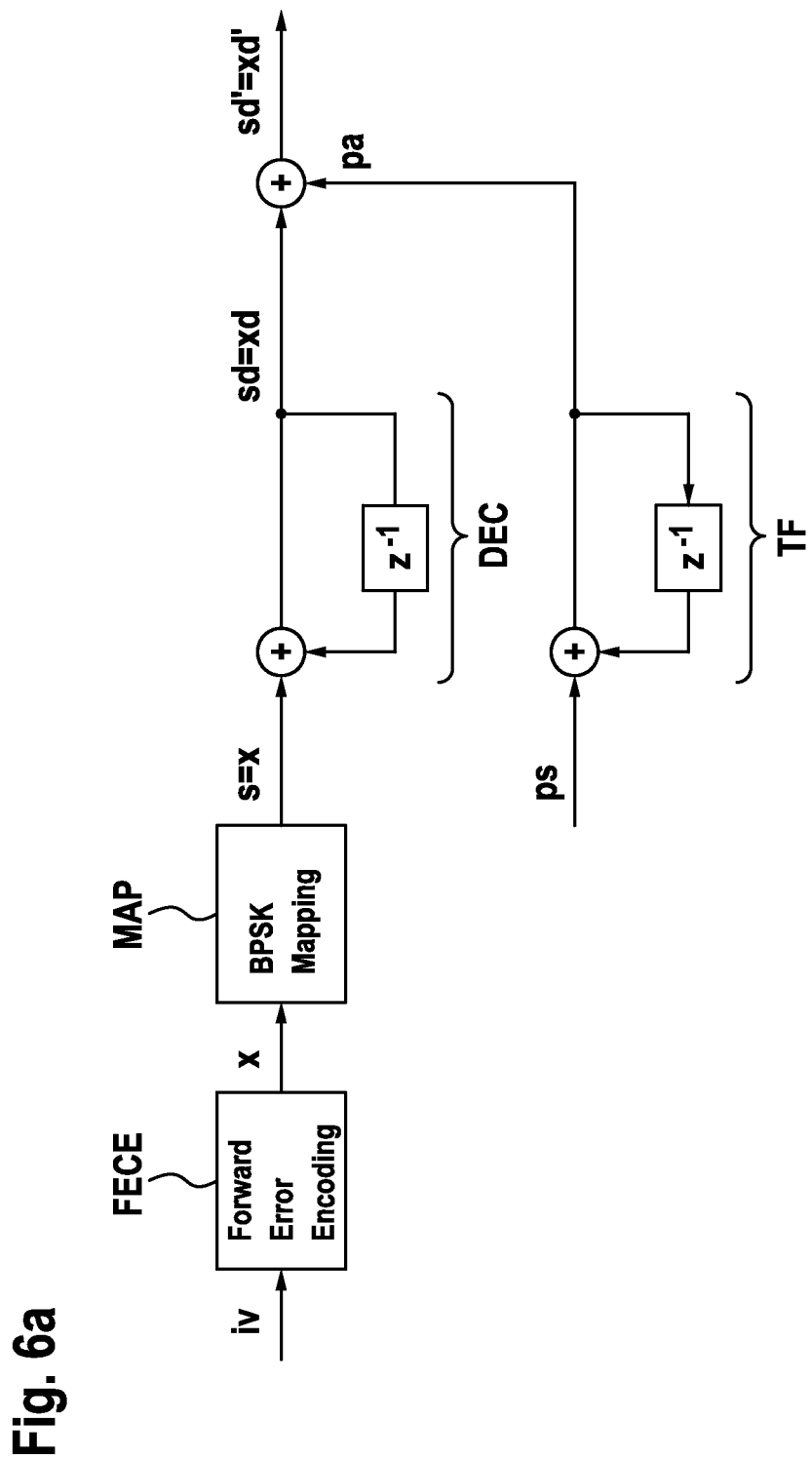

| $S_B$ \ $S_A$ | $\hat{=}0$ 00 | $\hat{=}1$ 01 | $\hat{=}2$ 11 | $\hat{=}3$ 10 |
|---|---|---|---|---|
| $0 \hat{=} 00$ | 00 | 01 | 11 | 10 |
| $1 \hat{=} 01$ | 01 | 11 | 10 | 00 |
| $2 \hat{=} 11$ | 11 | 10 | 00 | 01 |
| $3 \hat{=} 11$ | 10 | 00 | 01 | 11 |

$$Lxd'\_i = \frac{2}{\sigma_N^2} \cdot Y$$

$$Lxd'\_q = \frac{2}{\sigma_N^2} \cdot Z$$

METHOD OF DECODING A DIFFERENTIALLY ENCODED PHASE MODULATED OPTICAL DATA SIGNAL

FIELD OF THE INVENTION

The invention relates to the field of telecommunications, and in particular to a method and a device for decoding a differentially encoded phase-shift keying modulated optical data signal carrying forward error correction encoded data values.

BACKGROUND

In optical data transmission, digital data values may be transmitted by means of an optical transmission signal. The optical transmission signal is generated, by modulating the phase and/or the amplitude of an optical carrier signal, which possesses a carrier frequency, in dependence on the transmitted data values and in accordance with a constellation diagram of a respective phase-shift keying (PSK) modulation or Quadrature Amplitude Modulation (QAM) method. Each point of the constellation diagram represents a finite set of data values that are to be transmitted, wherein the set of data values is called a data symbol. A data symbol is represented by a corresponding constellation point of a constellation diagram, wherein the constellation point has a corresponding symbol phase and amplitude value. Depending on the data symbols that are to be transmitted, respective constellation points and symbol phase values are derived. The phase and the amplitude of the optical carrier signal are modulated, such that it corresponds to the derived symbol phase values and amplitude values representing the respective data symbols.

When using a pure PSK modulation method, only the phase is modulated, while the amplitude is kept constant. When using a QAM method, the phase is modulated just as in a PSK scheme, but also the amplitude is modulated for obtaining a higher data rate. Thus, a QAM method may be interpreted as a PSK modulation method with an additional amplitude modulation. Therefore, in this patent application, the term PSK modulation method shall include a pure PSK modulation method as well as a QAM method.

Preferably, the data values are data bits. An example for a phase-shift keying modulation method is Binary Phase-Shift Keying (BPSK), in which each point of the corresponding constellation diagram represents one bit and in which adjacent constellation points are separated by a separation angle that has an absolute value of $\pi$. Another example of a phase-shift keying modulation method is Quadrature Phase-Shift Keying (QPSK), in which each constellation point represents a data symbol consisting of two bits and in which adjacent constellation points are separated by a separation angle that has an absolute value of $\pi/2$.

At a receiving side, received data values may be derived, by carrying out a coherent reception scheme: the received optical transmission signal is mixed with a coherent optical signal that possesses the carrier frequency and a phase, which is ideally equal to the phase of the optical carrier signal used at the transmitting side. This mixing yields a resulting optical baseband signal. The optical baseband signal is converted to a sampled electrical signal via analogue-digital conversion, and the phase of the sampled electrical signal is estimated for deriving received data values. When using a hard decision detection scheme, it is decided for that point of the constellation diagram, whose symbol phase value is most similar to the estimated phase of the received optical carrier signal. Corresponding data symbols and corresponding data valued are then derived from the estimated symbol phase values.

When transmitting an optical signal over an optical transmission channel, the signal's phase may be degraded by a phase offset that may be estimated at the receiver. The phase of the PSK modulated optical signal may then be corrected by this estimated phase offset. The estimated phase offset may be erroneous to a degree, such that the correction of the received optical signal causes a rotation of the PSK constellation diagram by a whole numbered multiple of the separation angle from the receiver's perspective. Such a rotation of the constellation diagram occurs from the time instance of one data symbol to a next time instance of a next successive data symbol and is called a phase slip. A typical value for a probability of a phase slip is for example $10^{-3}$.

When relying on a hard decision detection scheme at the receiver, the effects of a phase slip are the following: If a phase slip causes a rotation of the constellation diagram at a certain time instance, and if the constellation diagram maintains to be rotated for further time instances, then this leads to false derived data values for the certain time instance and for the further time instances.

A known countermeasure against phase slips is the technique of differential coding. On the transmission side, the derived data symbols are differentially encoded into differentially encoded data symbols, such that a derived data symbol is represented by a transition from one differentially encoded data symbol to a next successive differentially encoded data symbol. The differentially encoded data symbols are then mapped onto the PSK constellation diagram. On the receiving side, the received differentially encoded data symbols are observed. Differential decoding may be performed, by deriving a differentially decoded data symbol from a transition from one differentially encoded data symbol to a next differentially encoded data symbol. In other words, data symbols are derived at the receiver by phase changes between successive received differentially encoded data symbols. The derived differential decoded data symbols represent differential decoded data values, as previously mentioned.

When relying on differential encoding in combination with a hard decision detection scheme at the receiver, the effects of a phase slip are the following: If a phase slip causes a rotation of the constellation diagram at a certain time instance, and if the rotation of the constellation diagram prevails for next further time instances, then this leads to false derived data values for the certain time instance but not for the next further time instances; but, if a phase slip causes a rotation of the constellation diagram only for the certain time instance, and if the rotation of the constellation diagram does not prevail for the next further time instances, then this leads to false derived data values for the certain time instance and also for that single next time instance that succeeds the certain time instance.

SUMMARY

It is an objective of the proposed method, to improve the known method of optical data transmission. Proposed is a method of decoding a differentially encoded phase-shift keying modulated optical data signal carrying forward error correction (FEC) encoded data values.

The differentially encoded phase-shift keying modulated optical signal is corrected by an estimated phase offset.

From the corrected signal, respective likelihood values for the FEC encoded data values are derived, using an estimation algorithm which accounts for a differential encoding rule used for differentially encoding the differentially encoded phase-shift keying modulated optical signal.

The derived likelihood values are limited to a predetermined range of values. FEC decoded data values are derived from the limited likelihood values, using an algorithm which accounts for a FEC encoding rule used for FEC encoding of the FEC encoded data values.

In order to appreciate the advantages of the proposed method, the following aspects have to be considered.

The amplitude of a likelihood value indicates the likelihood that the respective FEC encoded data value is equal to a possible discrete value of the data values' alphabet value set. The sign of the likelihood value indicates that value to which the data value is assumed to be equal to. The greater the amplitude of a likelihood value, the stronger is the indication that the respective data value is equal to the indicated value. Therefore, the greater the amplitude of a likelihood value, the higher is the impact of the likelihood value onto the estimation algorithm that is used for deriving the FEC decoded data values from the likelihood values.

When deriving the likelihood values from the corrected signal, a phase slip may lead to one or more likelihood values, for which the amplitude and/or the sign is changed due to the phase slip. If, for example, the amplitude of a likelihood value is increased due to the phase slip, then this would cause a false increased impact of the likelihood value onto the FEC decoding algorithm that is used for deriving the FEC decoded data values from the likelihood values. If, for example, the sign of a likelihood value is changed due to the phase slip, then this would cause an impact of the likelihood value, which indicates a false value, onto the FEC decoding algorithm that is used for deriving the FEC decoded data values from the likelihood values.

Thus, by limiting the likelihood values to a predetermined range of values, a false impact of those likelihood values, which are affected by a phase slip, onto the FEC decoding algorithm is avoided to a certain degree. This helps to reduce the number of errors of FEC decoded data values in case of one or more phase slips.

The proposed method has also the advantage that the possibility of a phase slip occurrence is taken into account for deriving differentially decoded data values. Further still, the proposed method has the advantage, that instead of directly applying a hard-decision detection scheme, an estimation algorithm is used for deriving a sequence of likelihood values. This allows for a more reliable derivation of received data values.

BRIEF DESCRIPTION OF THE FIGURES

FIG. 1 shows block diagrams of a transmission device and a receiving device.

FIG. 6a shows a block diagram modelling the effect of a phase slip for BPSK.

DESCRIPTION OF EMBODIMENTS

FIG. 1 shows a transmission device TX. The transmission device TX receives a sequence iv of information data values as $$iv=[iv(1), \ldots ,iv(C)], \text{ with index } c=1 \ldots C.$$

The information data values iv are encoded into a sequence x of FEC encoded data values in a step FECE of Forward Error Encoding as $$x=[x(1), \ldots ,x(K)], \text{ with index } k=1 \ldots K.$$

In a mapping step MAP, sets of L consecutive FEC encoded data values are mapped onto a data symbol s(m) of a PSK constellation diagram, which yields a sequence s of data symbols as $$s=[s(1), \ldots ,s(M)], \text{ with index } m=1, \ldots ,M, \text{ wherein } M=K/L.$$

Each data symbol s(m) represents a sub-sequence of L FEC encoded data values as $$s(m)=[x(L(m-1)+1), \ldots ,x(Lm)].$$

In a differential encoding step DEC, the sequence of data symbols s is differentially encoded into a sequence sd of differentially encoded data symbols as $$sd=[sd(1), \ldots ,sd(M)], \text{ with index } m=1, \ldots ,M.$$

The sequence sd of differentially encoded data symbols represents a sequence xd of differentially encoded and FEC encoded data values as $$xd=[xd(1), \ldots ,xd(K)], \text{ with index } k=1 \ldots K,$$

wherein each differentially encoded data symbol sd(m) represents a sub-sequence of differentially encoded and FEC encoded data values xd(k) as $$sd(m)=[xd(L(m-1)+1), \ldots ,xd(Lm)].$$

The possible values of the differentially encoded data symbols sd(m) are represented by constellation points of the PSK constellation diagram used for the optical data transmission, as it will explained in detail further below.

In a modulation step MOD, the transmission device TX generates an optical transmission signal ots(t), by modulating the phase of an optical carrier signal ocs(t) in dependence on the differentially encoded data symbols sd and in accordance with the PSK constellation diagram. The phase of the signal ocs(t) is modulated, such that it corresponds to the symbol phase values of the constellation points representing the differentially encoded data symbols sd.

The differentially encoded phase-shift keying modulated optical signal ots(t) is transmitted over an optical transmission channel OTC. During the transmission, the optical transmission signal ots(t) may be subject to phase changes caused by the optical transmission channel OTC.

The transmitted signal ots(t) is received at a receiving device RX. From the received signal ots(t), a phase error PE is estimated in a phase estimation step PES. The phase of the received signal ots(t) is corrected by the estimated phase error PE in a phase correction step PC, which yields a corrected signal cs(t). The corrected signal cs(t) is possibly subject to one or more phase slips.

Figure 2A:
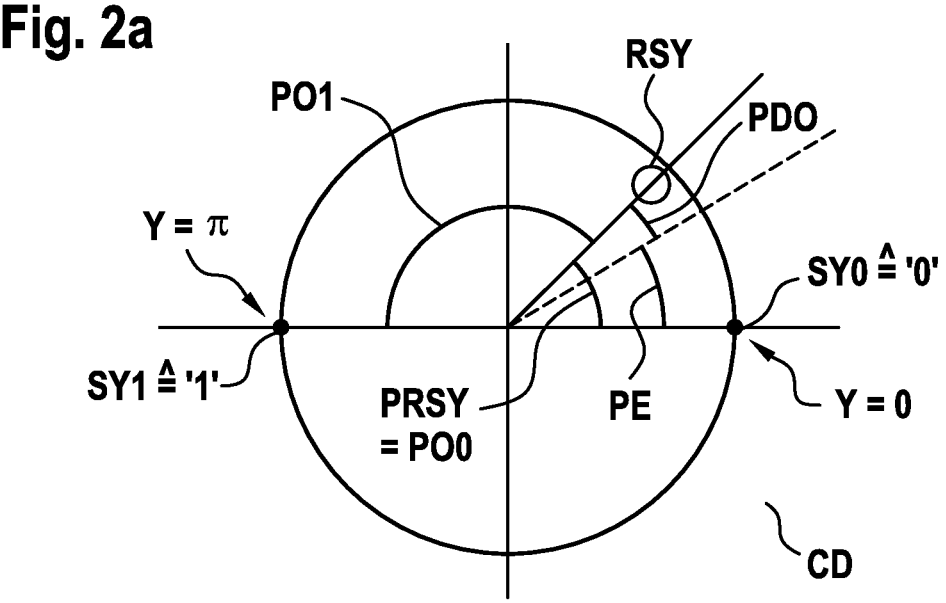
FIGS. 2a, 2b, 2c and 2d show phase values on PSK constellation diagrams.

The effect of a phase slip is explained in detail with regard to the FIGS. 2a, 2b, 2c and 2d. FIG. 2a shows a BPSK constellation diagram CD, in which a constellation point SY1 with the phase value of r represents a data symbol '1', and in which a constellation point SY0 with the phase value of 0 represents a data symbol '0'. The absolute value of the separation angle, which separates the adjacent constellation points, is π. As an example, the phase and the amplitude of the received optical signal may be such that they correspond to a received data symbol RSY, indicated as a circle in FIG. 2a and representing a phase value of PRSY.

Figure 2B:
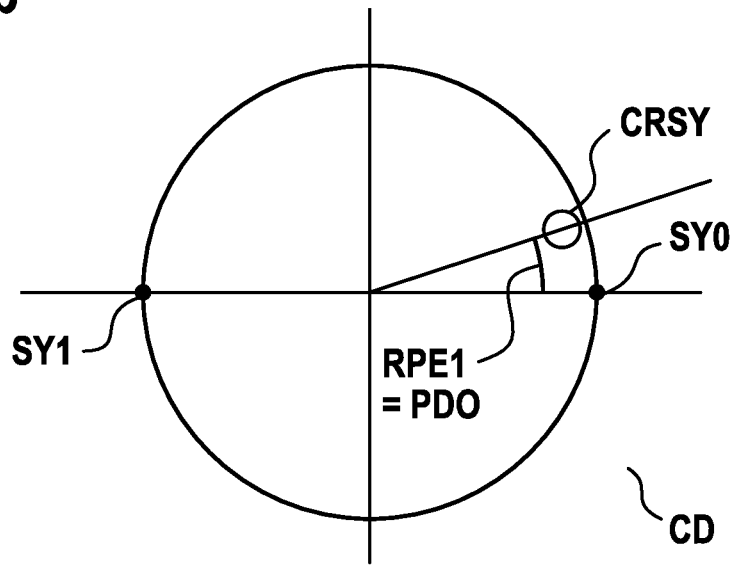

For the case that a data symbol SY0 equal to '0' was transmitted, the phase offset PO0 caused by the optical transmission channel is equal to the phase value of PRSY. The phase offset may for example be estimated to a value PE that is almost equal to the actual phase value PRSY. The phase difference PDO is the absolute error between the estimated phase offset PE and the actual phase offset PO0 in this case. The result of a phase correction by the estimated phase offset PE in the case that a symbol SY0 was transmitted is shown in FIG. 2b. The corrected phase of the corrected symbol CRSY differs from the phase value of the data symbol SY0 only by a remaining phase error RPE1, which is in this case equal to the absolute value of the estimation error PDO. The corrected phase value CRSY may later on be used, for reliably detecting a transmission of the data symbol SY0 equal to '0'.

But, it may also be the case, that a data symbol of SY1 equal to '1' was actually transmitted, in which case the phase offset PO1, shown in FIG. 2a, was caused by the optical transmission channel. If also in this case, due to estimation errors, the estimated phase offset is estimated to be equal to the value PE, then there is a great difference between the estimated phase offset PE and the actual phase offset PO1 caused by the transmission channel.

Figure 2C:
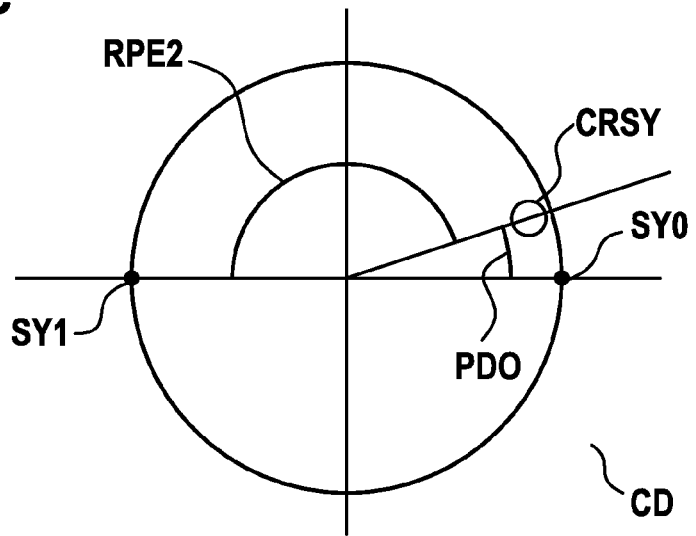
Figure 2D:
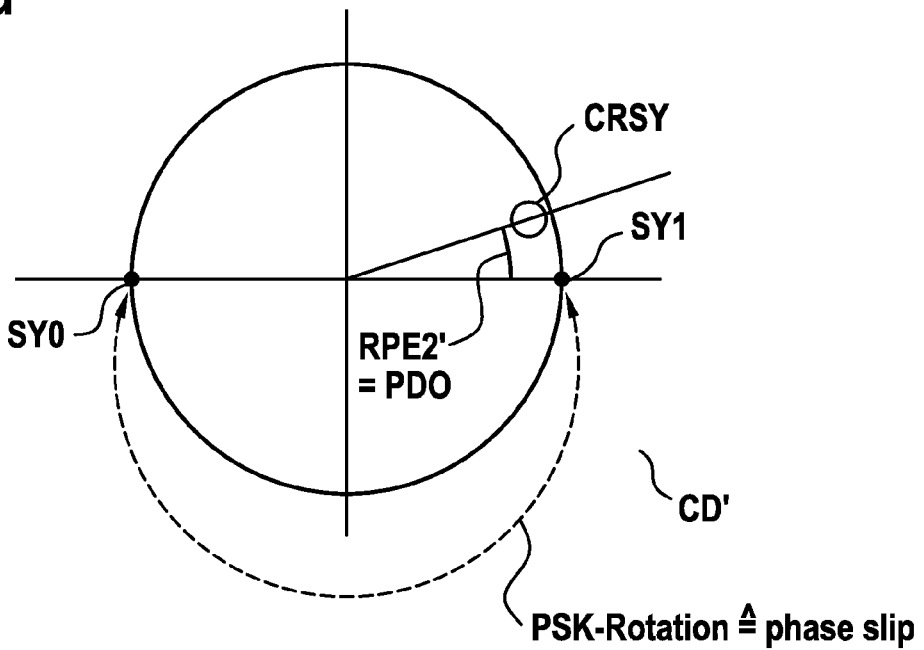

FIG. 2c shows the result of a phase correction by the estimated phase offset PE for the case that a symbol SY1 was transmitted. Such a correction leads also in this case to the corrected received symbol phase value CRSY. The remaining phase error RPE2 is in this case equal to the phase value of π minus the phase difference PDO. As it is evident from FIG. 2c, in this case, the corrected received symbol phase value CRSY can not be used reliably to detect a transmission of the actually transmitted symbol SY1 if no further assumptions are made. But if, as shown in FIG. 2d, an occurrence of a phase slip causing a rotation of the constellation diagram CD' by the separation angle π is assumed, then the corrected received symbol phase value CRSY differs from the transmitted symbol SY1 only by a remaining phase error RPE2', which is equal to the value of the phase difference PDO. Thus, by allowing for the possibility of a rotation of the constellation diagram due to a phase slip, a higher reliability of derived data symbols and derived data values can be achieved.

Figure 3:
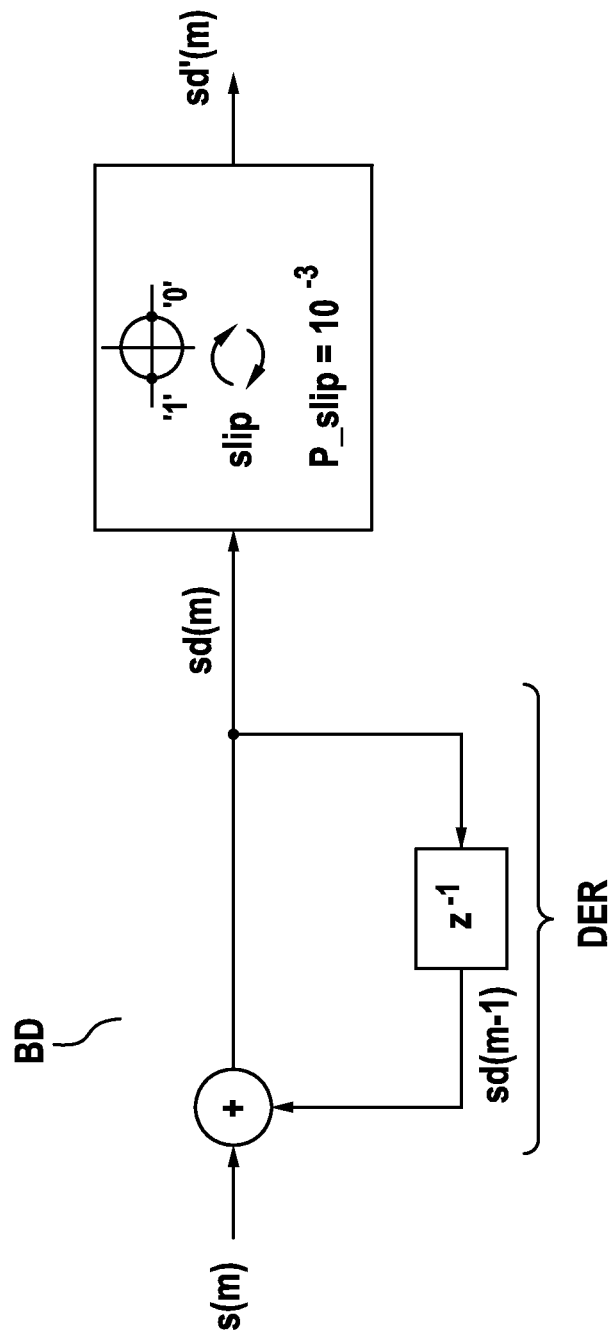
FIG. 3 shows a block diagram illustrating differential encoding in conjunction with phase slips.

FIG. 3 shows a block diagram BD that illustrates the differential encoding rule DER for differentially encoding time discrete data symbols s(m) at the transmission side, as well as a possible phase slip PS with a phase slip probability P_slip caused by a phase compensation at the receiver. This illustration is given for the example of BPSK. The indicated value of the phase slip probability P_slip=10−3 is an example of such a value, the actual value may depend on the actual optical transmission channel.

Differentially encoded data symbols sd(m) are derived, using a linear feedback shift register which contains a delay element DE. The transfer function of the linear feedback shift register performing the differential encoding rule is given in the z-domain as $$H_{DER}(z) = \frac{1}{1-z^{-1}}.$$

Thus, the derived differentially encoded data symbols sd(m) satisfy the equation $$sd(m)=s(m)\oplus sd(m-1),$$

wherein the addition ⊕ indicates a modulo addition. For BPSK, the data symbols s(m) and the differentially encoded data symbols sd(m) are binary values. Therefore, for BPSK, the modulo addition ⊕ is a modulo-2 addition. Furthermore, since for BPSK it is L=1, the data symbols s(m) are equal to the FEC encoded data values x(k=m), and the differentially encoded data symbols sd(m) are equal to the differentially encoded and FEC encoded data values xd(k=m).

The possible phase slip PS is modelled as a rotation of the constellation diagram by the separation angle of the constellation diagram. The phase slip has a predetermined phase slip probability P_slip, which may be set to a value of $10^{-3}$ for example. For BPSK, the separation angle is π, therefore a rotation of the BPSK constellation diagram is equal to an exchange of the symbol values '0' and '1', which is equal to a bit inversion of the differentially encoded data symbol sd(t) at the occurrence of the phase slip. For BPSK, this is also equal to a bit inversion of the differentially encoded and FEC encoded data values xd(k).

The potentially affected differentially encoded data symbols resulting from a possible phase slip are given as sd'(m); for BPSK, the potentially affected differentially encoded and FEC encoded data values xd'(k) are equal to the potentially affected differentially encoded data symbols sd'(m=k).

If no phase slip occurs, then the potentially affected differentially encoded data symbols sd'(m) are equal to the potentially transmitted differentially encoded data symbols sd(m) provided by the differential encoding rule DER.

Coming back to FIG. 1, a sequence of likelihood values Lx' is derived from the corrected signal cs(t) in a derivation step DS as $$Lx'=[Lx'(1), \ldots, Lx'(K)], \text{ with index } k=1, \ldots, K.$$

A likelihood value Lx'(k) indicates for a respective FEC encoded data value x(k) the probability, that the FEC encoded data value x(k) is equal to the value '0' or the value '1'. In other words, the FEC encoded data values x(k) are FEC encoded data bits, generated from information data bits iv(k) via FEC encoding.

The likelihood values Lx' are derived via a first derivation sub-step DS1 and a second derivation sub-step DS2.

As previously outlined, each differentially encoded data symbol sd(m) represents a sub-sequence of differentially encoded and FEC encoded data values xd(k) as $$sd(m)=[xd(L(m-1)+1), \ldots, xd(Lm)].$$

In the first derivation sub-step DS1, a sequence of likelihood values Lxd' is derived from the corrected optical signal cs(t) as $$Lxd' = [Lxd'(1), \ldots, Lxd'(K)], \text{ with index } k=1, \ldots, K,$$

wherein a likelihood value Lxd'(k) indicates for a respective differentially encoded and FEC encoded data value xd(k) the probability, that the data value xd(k) is equal to the value '0' or the value '1'. It will be described later on with respect to the FIGS. 4a, 4b and 4c, in which way the likelihood values Lxd' can be derived from the corrected signal cs(t).

In the second derivation sub-step DS2, a sequence of likelihood values is derived from the sequence of likelihood values Lxd' as $$Lx' = [Lx'(1), \ldots, Lx'(K)], \text{ with index } k=1, \ldots, K,$$

wherein a likelihood value Lx'(k) indicates for a respective differentially decoded and FEC encoded data value x(k) the probability, that the data value x(k) is equal to the value '0' or the value '1'. The sub-step DS2 uses an estimation algorithm EA, which accounts for a differential encoding rule used for differentially encoding the differentially encoded phase-shift keying modulated optical signal ots(t). It will be describe later on with respect to the FIG. 5a, in which way the likelihood values Lx' are derived from the sequence of likelihood values Lxd'.

The derived likelihood values Lx' are limited to a predetermined range of values in a limiting step LS, which yields a sequence of limited likelihood values Lx. This step LS of limitation will be described in detail later on with respect to the FIGS. 6a, 6b and 7.

From the limited likelihood values Lx, a sequence of FEC decoded information data values iv' is derived in a step FECD of FEC decoding, using an algorithm that accounts for a FEC encoding rule used for FEC encoding the FEC encoded data values x.

As previously outlined, when deriving the likelihood values Lxd' from the corrected signal cs(t), a phase slip may lead to one or more likelihood values Lxd' and furthermore also likelihood values Lx', for which the amplitude and/or the sign is changed due to the phase slip. If, for example, the amplitude of a likelihood value Lx'(k) is affected by the phase slip, then this would cause a false impact of the indicated data value onto the FEC decoding algorithm that is used for deriving the FEC decoded information data values iv' from the likelihood values.

Thus, by limiting the likelihood values Lx' to a predetermined range of values and using the limited likelihood values Lx instead, a false impact of those likelihood values Lx'(k), which are affected by a phase slip, onto the FEC decoding algorithm is avoided to a certain degree. This helps to reduce the number of errors of FEC decoded data values in case of one or more phase slips. The limitation of the likelihood values Lx' to a predetermined range of values will be described in detail later on with respect to the FIGS. 6a, 6b and 7.

Figure 4A:
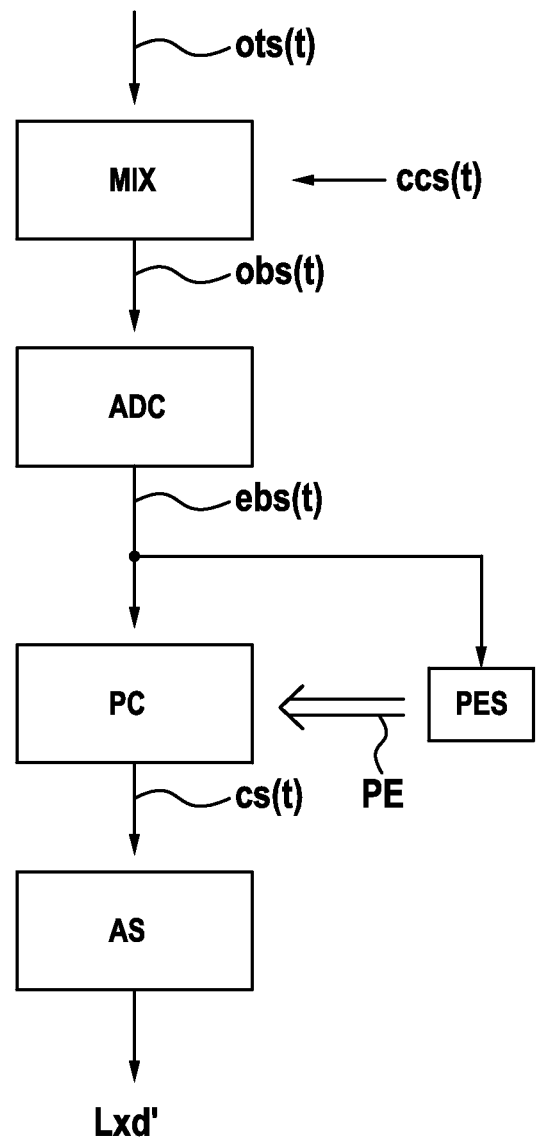
FIG. 4a shows steps of a method for deriving likelihood values.

FIG. 4a shows sub-steps of deriving one or more likelihood values Lxd'(k) from the received optical signal ots(t).

The received optical signal ots(t) is mixed in a mixing step MIX with an optical phase-coherent carrier signal ccs(t), that possesses essentially the carrier frequency of the optical carrier signal used at the transmitter side. The local coherent optical signal ccs(t) is a signal provided by a local oscillator not shown in FIG. 4a. The phase $\phi_{CS}$ of the optical phase-coherent carrier signal ccs(t) is equal to the phase $\phi_{OCS}$ of the optical carrier signal used at the transmitting side plus/minus a whole numbered multiple of the PSK separation angle $\phi_{SEP-PSK}$ and a phase offset $\Delta\phi$ as $$\phi_{CS} = \phi_{OCS} \pm N \cdot \phi_{SEP-PSK} + \Delta\phi, \text{ with } N=0,1,2,\ldots.$$

The mixing yields a resulting optical baseband signal obs(t). The optical baseband signal obs(t) is converted to a sampled electrical signal ebs(t) via analogue-digital conversion ADC. In a phase offset estimation step PES, a phase offset PE caused by the transmission channel is estimated from the sampled electrical signal ebs(t). This estimated phase offset PE is provided to a phase correction step PC. In the phase correction step PC, the phase of the sampled electrical signal ebs(t) is modified by the estimated phase offset PE. The resulting corrected electrical signal cs(t) is then used in an analysis step AS for deriving one or more likelihood values Lxd'.

Figure 4B:
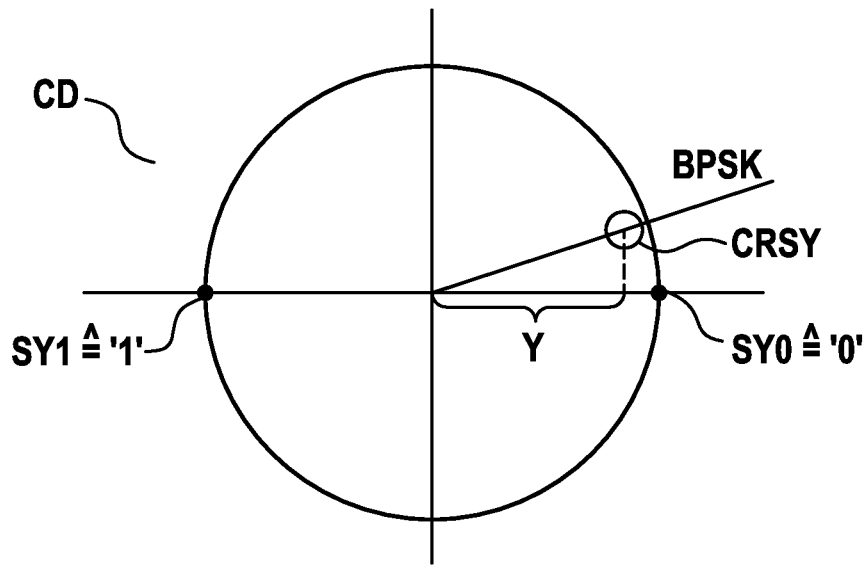
FIG. 4b shows a received data symbol on a BPSK constellation diagram.

FIG. 4b shows a PSK constellation diagram CD, in this example for a BPSK modulation scheme. As previously mentioned, for BPSK a differentially encoded data symbol sd(m) is equal to a differentially encoded and FEC encoded data value xd(k=m). The constellation point SY0 at the phase position $\phi=0$ represents a differentially encoded data symbol of the value sd=xd=0. The constellation point SY0 at the phase position $\phi=0$ is equal to a signal amplitude of +1. The constellation point SY1 at the phase position $\phi=\pi$ represents a differentially encoded data symbol of the value sd=xd=1. The constellation point SY1 at the phase position $\phi=\pi$ is equal to a signal amplitude of −1.

As a non-limiting example, it shall be assumed, that a corrected received symbol value CRSY is derived from the corrected electrical signal cs(t) for the time instance t=2. It is assumed, that the transmission channel in combination with the phase correction may not only cause a transmission distortion that may result in a phase slip, but also a deviation of corrected received symbol values CRSY from the constellation points SY0, SY1 due to a transmission distortion in the form of an additive white Gaussian noise (AWGN) signal.

A likelihood value Lxd' is determined, which indicates whether the received differentially encoded data value xd is equal to a '0' or to a '1' for the time instance t=2. For this, the log-likelihood ratio $$Lxd'(t) = \ln \frac{P(xd(t)=0)}{P(xd(t)=1)}$$

is calculated as a reliability value in the logarithmic domain. Herein, P(xd(t)=1) is the probability, that xd is equal to '1', while P(xd(t)=0) is the probability that xd is equal to '0'.

It can be shown, that for the assumption of an AWGN noise signal with a variance of $\sigma_N^2$, the log-likelihood ratio Lxd'(t) can be easily determined as $$Lxd'(t) = \ln \frac{P(xd(t)=0)}{P(xd(t)=1)} = \frac{2}{\sigma_N^2} \cdot y,$$

wherein y is the amplitude of the corrected received symbol CRSY on the real axis along which the constellation points SY0 and SY1 are placed. The variance $\sigma_N^2$ of the assumed AWGN noise is provided as a predetermined value. In the example of FIG. 4b, the symbol value CRSY has a corresponding positive amplitude Y on the real axis, which would lead to a positive value for Lxd', which indicates a likelihood of the data value Lxd' to the value '0'. If the symbol value would be for example close to the constellation point SY1='1' and thus lie left of the imaginary axis with a negative amplitude on the real axis, then this would result in a negative value for Lxd', which indicates a likelihood of the data value Lxd' to the value '1'.

Figure 4C:
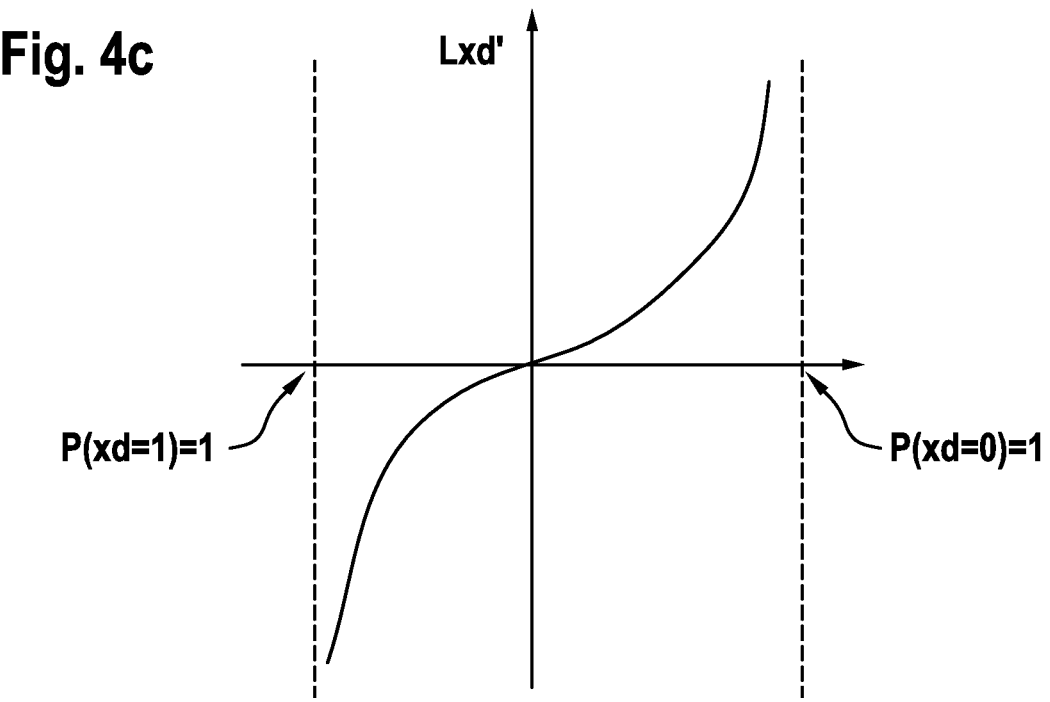
FIG. 4c shows a value range of a likelihood value.

FIG. 4c shows a graph of possible values for Lxd'(t) in relation to the probabilities P(xd(t)=0)=1 and P(xd(t)=1)=1. It is evident, that for a high probability of P(xd(t)=1), the likelihood value Lxd'(t) takes on large negative values, while for a high probability of P(xd(t)=0), the likelihood value Lxd'(t) takes on large positive values.

It has been shown in detail with respect to the FIGS. 4a, 4b and 4c, in which way a likelihood value Lxd'(t=2) can be derived from corrected received symbol values CRSY for the time instance of t=2. The corrected received symbol values CRSY were obtained, by phase coherent mixing of the received optical signal and phase correction by an estimated phase offset. By obtaining further corrected received symbol values for further time instances, likelihood values Lxd'(t) can be derived, which indicate for the respective time instances whether the received differentially encoded and FEC encoded data value xd(t) is equal to '1' or '0'. In which way a derivation of likelihood values Lxd'(t) can be performed in the case of QPSK will be described later on with reference to FIG. 12.

Coming back to FIG. 4a, the step PES of estimating the phase offset PE may be carried out, relying on the method proposed in "Viterbi, A. J., and Viterbi, A. M.: '*Nonlinear estimation of PSK-modulated carrier phase with application to burst digital transmission*', IEEE Transaction on Information Theory, 1983, 29, pp. 543-551", or alternatively relying on the method proposed in "Pfau, T.; Hoffmann, S.; Noe, R.; "*Hardware-Efficient Coherent Digital Receiver Concept With Feedforward Carrier Recovery for M-QAM Constellations*" Journal of Lightwave Technology, Vol. 27 pp. 989-999, 2009".

Furthermore, in the case that the frequency of the optical carrier signal used on the transmission side may deviate from the frequency of the optical signal ccs(t) used for coherent mixing MIX, a frequency offset can be estimated from the received optical signal ots(t) in a step of frequency offset estimation, not shown explicitly in FIG. 4a. This frequency of the carrier signal ccs(t) may then be changed by the estimated frequency offset in a step of frequency compensation, not shown explicitly in FIG. 4a. An estimation of the frequency offset may be carried out according to the method proposed in "Andreas Leven, Noriaki Kaneda, Ut-Va Koc, and Young-Kai Chen, '*Frequency Estimation in Intradyne Reception*' Photonics Technology Letters, IEEE, vol. 19, 2007, pp. 366-368", alternatively by relying on the method proposed in "A. D'Amico, A. D'Andrea, and R. Regiannini, '*Efficient non-data-aided carrier and clock recovery for satellite DVB at very low signal-to-noise ratios*' Selected Areas in Communications, IEEE Journal on, vol. 19, 2001, pp. 2320-2330".

Figure 5A:
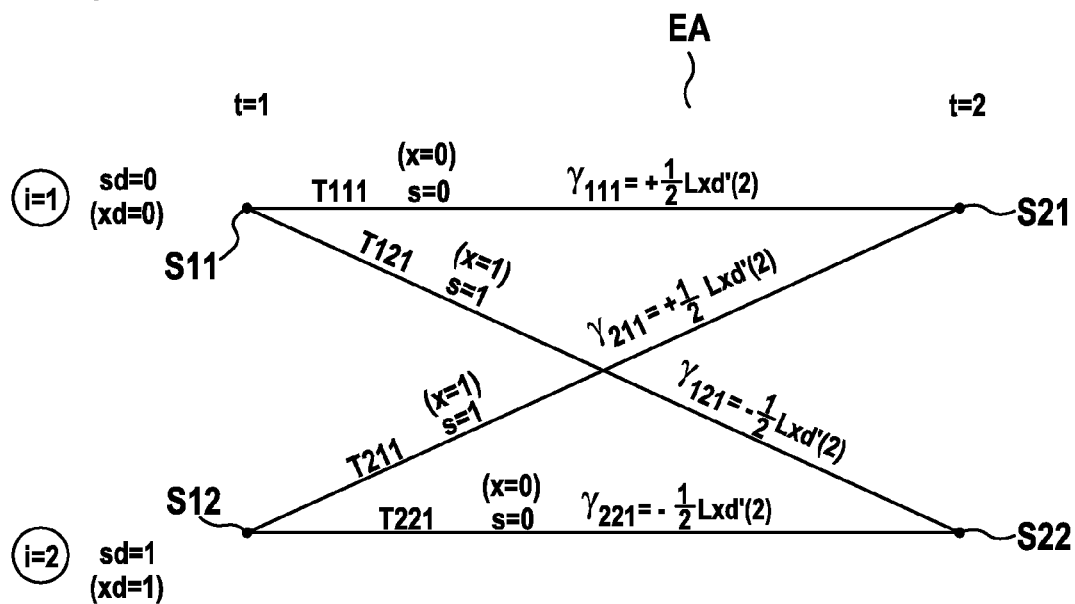
FIG. 5a shows states and state transitions of an estimation algorithm.

FIG. 5a shows the estimation algorithm EA, which is used in the sub-step DS2 of FIG. 1, for deriving from the likelihood values Lxd' of the differentially encoded and FEC encoded data values xd the likelihood values Lx' of the differentially decoded but FEC encoded data values x. The estimation algorithm EA accounts for a differential encoding rule used for differentially encoding the differentially encoded phase-shift keying modulated optical signal ots(t) on a transmitting side.

The estimation algorithm EA stipulates for each time instance with the index t different states Sti, wherein i is the state index. For the example of a BPSK constellation diagram, as shown in FIG. 5a, the state index values i=1, 2 are indicated on the left hand side of the estimation algorithm EA. For a PSK constellation diagram with N constellation points, the number of different states that are stipulated is equal to N.

The estimation algorithm EA stipulates for a time instance t with the index t=1 a hypothetical state S11, which represents a potentially transmitted differentially encoded data symbol sd(t=1) of '0', which is for BPSK equal to a sequence xd of differentially encoded and FEC encoded data values xd=[0], as previously outlined. Furthermore, the estimation algorithm EA stipulates a hypothetical state S12, which represents a potentially transmitted differentially encoded data symbol sd(t=1) of '1', which is for BPSK equal to a sequence xd of differentially encoded and FEC encoded data values xd=[1], as previously outlined.

The algorithm EA stipulates also for a time instance t with the index t=2 a hypothetical state S21, which represents potentially transmitted differentially encoded data symbol sd(t=2) of '0', and a hypothetical state S22, which represents a potentially transmitted differentially encoded data symbol sd(t=2) of '1'.

Furthermore, transitions T111, . . . , T221 are stipulated. A transition Tijt has an index ijt, which indicates the i-th state from which the transition starts, the j-th state to which the transition leads, and the time index t, at which the transition starts.

It is now explained in detail, in which way the estimation algorithm EA accounts for the differential encoding rule. As previously stated, the states S11, . . . , S22 represent corresponding differentially encoded data symbols sd(t).

It shall be assumed, that at the time instance t=1, the differential encoder DER of FIG. 3 is in a state of sd(t=1)=0.

If the next successive data symbol s(t=2) is equal to '0', then the differential encoder DER transits to a state of sd(t=2)=0, which is represented by the state S21. The next successive data symbol s(t=2)=0 as a differentially decoded data symbol is associated with the corresponding state transition T111. As previously outlined, for the case of BPSK a differentially decoded data symbol s(t=2)=0 represents a sequence x of differentially decoded but FEC encoded data values as x=[0].

If the next successive data value s(t=2) is equal to '1', then the differential encoder DER transits to a state of sd(t=2)=1, which is represented by the state S22. The next successive data symbol s(t=2)=1 as a differentially decoded data symbol is associated with the corresponding state transition T121. As previously outlined, for the case of BPSK a differentially decoded data symbol s(t=2)=1 represents a sequence x of differentially decoded but FEC encoded data values as x=[1].

It has been explained above in detail for the case that the differentially encoded data symbol is sd(t=1)=0, in which way differentially decoded data symbols s(t) are represented by the state transitions T111, T121. For the case that the differentially encoded data symbol at the time t=1 is sd(t=1)=1, differentially decoded data symbols s(t=2) are represented by the state transitions T211, T221.

To each transition T111, T121, T211, T221, leading from the states S11, S12 to the states S21, S22, a respective differentially decoded data symbol s(t=2) is associated; by this, the algorithm accounts for a differential encoding rule used on the transmission side. For the transitions T111, T121, T211, T221, respective transition probabilities $\gamma_{111}$, . . . , $\gamma_{221}$ are derived, using the likelihood values Lxd' that are derived from the corrected signal.

The state transitions T111, . . . , T221, that represent differentially decoded data symbols s(t), have corresponding transition probabilities $\gamma_{111}$, . . . , $\gamma_{221}$. In this example, the transition probabilities $\gamma_{111}$, . . . , $\gamma_{221}$ are given in the logarithmic domain; this does not necessarily have to be the case, they might instead be given in the linear domain. The transition probabilities $\gamma_{111}$, . . . , $\gamma_{221}$ are initialized using one or more likelihood values Lxd'(t=2) derived from the corrected signal for the time instance t=2. For normalization reasons, a likelihood value Lxd' may be multiplied by a normalization factor ½.

The likelihood value Lxd'(t=2) for the differentially encoded data value xd is derived from the optical signal at the time t=2 and indicates a probability, whether a corresponding differentially encoded data symbol sd(t=2) is equal to '0' or equal to '1'. If the probability is high that the differentially encoded symbol value sd(t) is equal to '1', then the value Lxd'(t=2) takes on large negative values. If the probability is high that the potentially affected differentially encoded data value sd(t) is equal to '0', then the value Lxd'(t=2) takes on large positive values.

The transition probability $\gamma_{111}$ shall indicate the probability of a transition from the state S11 to the state S21. The state S11 represents a transmitted differentially encoded data symbol of sd(t=1)=0. The state S21 represents an assumed transmitted differentially encoded data symbol of sd(t=2)=0. Using the likelihood value Lxd'(t=2), the transition probability $\gamma_{111}$ is initialized. In the case, that the probability is high that the differentially encoded data symbol sd(t=2) is equal to zero as sd(t=2)=0, then the likelihood value Lxd(t=2) takes on a large positive value. Therefore, the transition probability $\gamma_{111}$ is initialized with the likelihood value Lxd'(t=2) multiplied by +½.

The transition probability $\gamma_{121}$ shall indicate the probability of a transition from the state S11 to the state S22. The state S11 represents a differentially encoded data symbol of sd(t=1)=0. The state S22 represents an assumed transmitted differentially encoded data symbol of sd(t=2)=1. Using the likelihood value Lxd'(t=2), the transition probability $\gamma_{121}$ is initialized. In the case, that the probability is high that the differentially encoded data symbol sd(t=2) is equal to one as sd(t=2)=1, then the likelihood value Lxd'(t=2) takes on a large negative value. Therefore, the transition probability $\gamma_{121}$ is initialized with the likelihood value Lxd'(t=2) multiplied by −½.

The further transition probabilities $\gamma_{211}$, $\gamma_{221}$ of the transitions T211, T221 are initialized in an analogue way using the probability value Lxd'(t=2). The sign used for this initialization is chosen to + or −, in dependence on the differentially encoded data symbols sd(t=2) represented by the state, to which the respective transition T111, T121, T211, T221 leads.

Further states representing differentially encoded data symbols may be stipulated for further time instances t=3, 4, . . . , which are not depicted in FIG. 5.

Using the stipulated states and the stipulated transition probabilities, the algorithm EA can be used for deriving from the likelihood values Lxd' of the differentially encoded and FEC encoded data values xd the likelihood values Lx' of the differentially decoded but FEC encoded data values x.

There are at least two alternatives for the estimation algorithm EA, that may be used in order to derive a sequence of likelihood values Lx' for respective differentially decoded but FEC encoded data values x from a sequence of likelihood values Lxd' for respective differentially encoded and FEC encoded data values xd.

According to a first alternative, the algorithm EA is an algorithm that is suitable to achieve a maximisation of respective probabilities of the corresponding derived differentially decoded data values xd; such an algorithm is the BCJR algorithm, for which a detailed description can be found in "L. Bahl, J. Cocke, F. Jelinek, and J. Raviv, 'Optimal Decoding of Linear Codes for minimizing symbol error rate', IEEE Transactions on Information Theory, vol. IT-20(2), pp. 284-287, March 1974", as well as in "David J. C. MacKay, 'Information Theory, Inference, and Learning Algorithms', Cambridge University Press, Version 72, Mar. 28, 20052003, Chapter 25, pp. 324 to 333". Care should be taken that notations of probabilities may be given in this reference in the linear domain, while the transition probabilities $\gamma_{ijt}$ are provided in the logarithmic domain.

According to a second alternative, the algorithm EA is a Viterbi algorithm, for which a detailed description can be found in "J. Hagenauer, E. Offer, L. Papke, 'Iterative Decoding of Binary Block and Convolutional Codes', IEEE Transactions on Information Theory, Vo. 42, No. 2, March 1996". Care should be taken that notations of probabilities may be given in this reference in the linear domain, while the transition probabilities $\gamma_{ijt}$ are provided in the logarithmic domain.

Once a sequence of likelihood values Lx' for respective differentially decoded but FEC encoded data values x is derived from a sequence of likelihood values Lxd' for respective differentially encoded and FEC encoded data values xd, the likelihood values Lx' are limited to a predetermined range of values, yielding the limited likelihood values Lx as previously mentioned with respect to FIG. 1. It will now be explained in detail with reference to the FIGS. 6a, 6b and 7, in which way a limitation of the likelihood values Lx' may be carried out.

FIG. 6a shows a model of a transmission channel, in which phase slips affect the differentially encoded data symbols sd, for the case of BPSK. Just as previously described with respect to FIG. 1, information data values iv are used for generating data values x in a FEC step FECE. Via PSK Mapping, data symbols s are generated from the FEC encoded data values x in a mapping step MAP. As previously outlined, a data symbol s is equal to a single data value x for the case of BPSK. Differentially encoded data symbols sd are generated from the data symbols s in a differential encoding step DEC. As previously outlined, a differentially encoded data symbol sd is equal to a single differentially encoded data value xd for the case of BPSK. The step of differential encoding DEC can be described by a transfer function in the z-domain as $$H_{DEC}(z) = \frac{1}{1-z^{-1}}.$$

Each time a phase slip occurs, the constellation diagram is rotated from the receiver's perspective by the separation angle. This can be described for BPSK as a change between two states of the constellation diagram, wherein in a first state the constellation diagram is in a correct position, such that the values sd=xd are not inverted, in a second state the constellation diagram is in a position rotated by the separation angle, such that the values sd=xd are inverted, and wherein a change between these two states occurs with the probability of a phase slip.

The above described states and the inversion of the values sd=xd can be modelled by a value pa, which is added via a modulo-2 addition to the values sd=xd, which takes on the value '0' if no inversion of the values sd=xd is present, which takes on the value '1' if an inversion of the values sd=xd persists, and which changes between the values '0' and '1' with the probability of a phase slip.

The modulo-2 addition of the values sd=xd with the value pa yields the final values sd'=xd' that are received later on at a receiving side.

This additive value pa itself can be modelled by a variable ps that is filtered by a transfer function TF in the z-domain as $$H_{TF}(z) = \frac{1}{1 - z^{-1}}.$$

The variable ps itself takes on the values '0' or '1' as $$ps \in \{0, 1\},$$

and the probability that the variable ps takes on the value '1' is the probability Ps of a phase slip $$P(ps=1) = P_s.$$

Figure 6B:
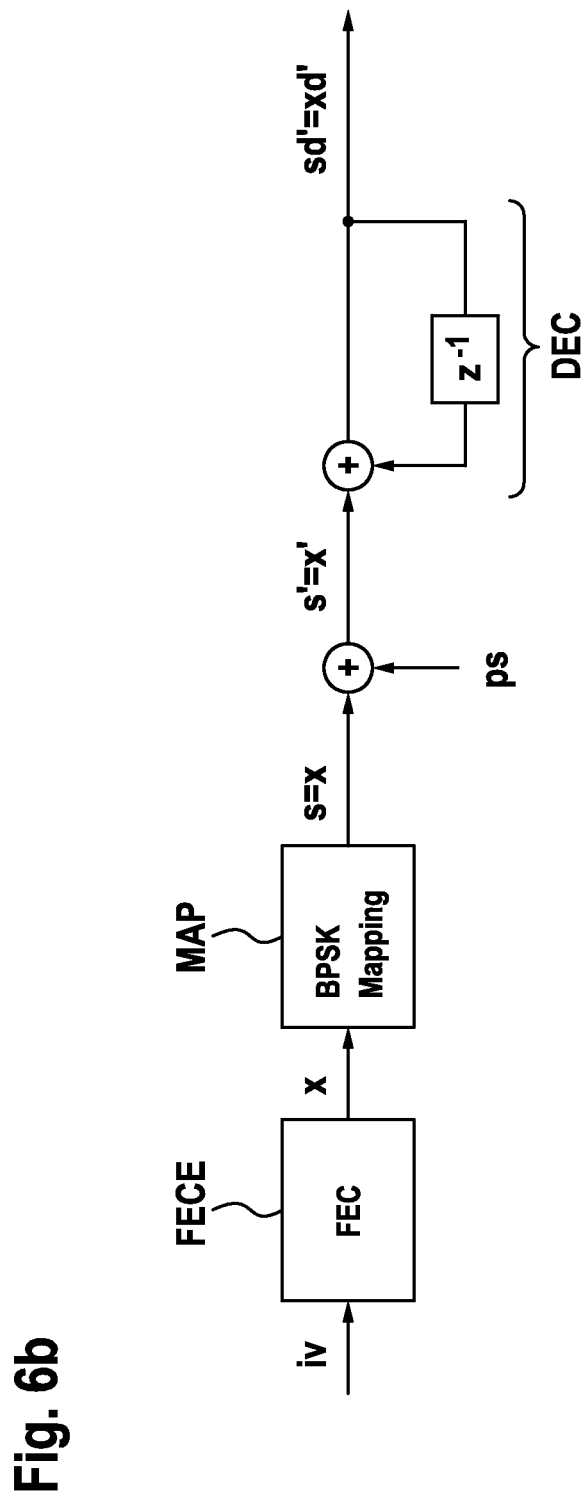
FIG. 6b shows a block diagram modelling the effect of a phase slip in an alternative way for BPSK.

As it is evident from the FIG. 6a, the transfer functions $H_{DEC}(z)$ and $H_{TF}(z)$ are equal. Therefore, the transmission channel model of FIG. 6a can be transferred to a transmission channel model shown in FIG. 6b.

In the transmission channel model shown in FIG. 6b, the values s=x are subject to a modulo-2 addition, such that to these values s=x the variable ps is directly added. This yields the modified values s'=x'. Thus, the result of a phase slip is modeled as an additive value ps, which takes on the value '1' with the probability Ps of a phase slip.

What has to be taken in to account at the receiving side, is that when likelihood values Lx' are derived from the corrected signal, as shown in the step DS in FIG. 1, these likelihood values Lx' actually indicate a probability, that the values s'=x', shown in FIG. 6b, take on either the value '0' or the value '1'. In order to obtain likelihood values Lx for the actual data values x, the possibility that a phase slip occurs has to be taken into account. Therefore, the phase slip probability is taken into account for modifying the likelihood values Lx'.

The likelihood value Lx' of the variable x' is defined by the log-ratio of the probability that x' is equal to '0' divided by the probability that x' is equal to '1' as $$Lx'(x') = \ln\left(\frac{P(x'=0)}{P(x'=1)}\right),$$

while the likelihood value Lx of the variable x is defined by the log-ratio of the probability that x is equal to '0' divided by the probability that x is equal to '1' as $$Lx(x) = \ln\left(\frac{P(x=0)}{P(x=1)}\right).$$

Using the Bayes' theorem together with a given phase slip probability Ps, one can derive that the likelihood value Lx' is a function of the likelihood value Lx and the phase slip probability Ps as $$Lx'(x') = \ln\left(\frac{P[x'=0]}{P[x'=1]}\right)$$

$$= \ln\left(\frac{P[x'=0 \mid x=0]P[x=0] + P[x'=0 \mid x=1]P[x=1]}{P[x'=1 \mid x=0]P[x=0] + P[x'=1 \mid x=1]P[x=1]}\right)$$

$$= \ln\left(\frac{(1-P_S)P[x=0] + P_S P[x=1]}{P_S P[x=0] + (1-P_S)P[x=1]}\right)$$

$$= \ln\left(\frac{(1-P_S)e^{Lx(x)} + P_S}{P_S e^{Lx(x)} + (1-P_S)}\right)$$

In a same way, one can derive that the likelihood value Lx is a function of the likelihood value Lx' and the phase slip probability Ps as $$Lx(x) = \ln\left(\frac{(1-P_S)e^{Lx'(x')} + P_S}{P_S e^{Lx'(x')} + (1-P_S)}\right).$$

Figure 7:
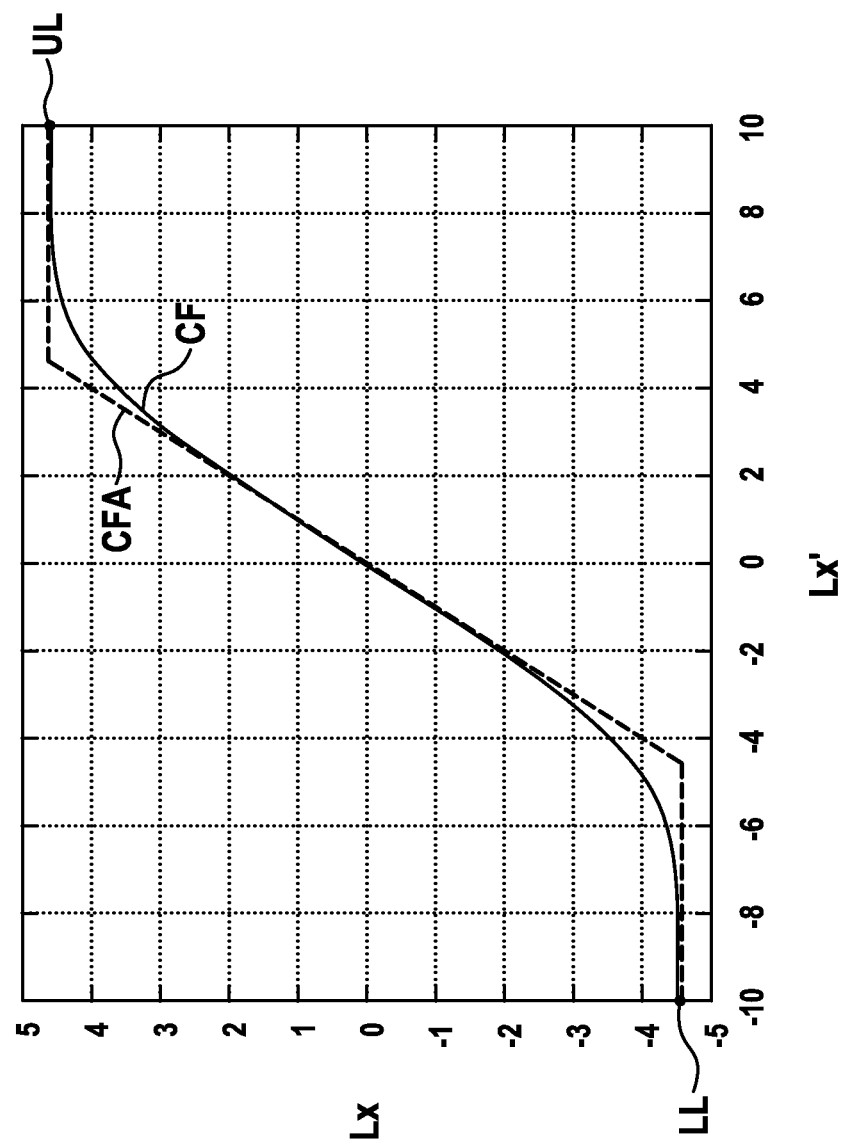
FIG. 7 shows functions describing a limitation of likelihood values.

FIG. 7 shows the likelihood value Lx as a function CF of the likelihood value Lx' for a phase slip probability of Ps=1e−2.

For Lx'→∞ the likelihood value Lx is limited to an upper limit value UL that depends only on the phase slip probability Ps as $$UL = \ln\left(\frac{(1-P_S)}{P_S}\right),$$

which in this example is for Ps=1e−2 the value UL=4.5951.

For Lx'→−∞ the likelihood value Lx is limited to a lower limit value LL that depends only on the phase slip probability Ps as $$LL = -\ln\left(\frac{(1-P_S)}{P_S}\right),$$

which in this example is for Ps=1e−2 the value LL=−4.5951.

Thus, when using the above mentioned function CF for deriving from the likelihood values Lx' the likelihood values Lx, this includes a limitation of the likelihood values Lx' to a range of values with an upper limit UL and a lower limit LL. The upper limit UL and the lower limit LL depend on a predetermined phase slip probability Ps. The limits UL and LL have absolute values that are equal to a likelihood value L_slip of the phase slip event. The likelihood value L_slip of the phase slip event is $$L_{SLIP} = \ln\left(\frac{(1-P_S)}{P_S}\right).$$

In other words, the step of limiting the derived likelihood values Lx' includes transforming these derived likelihood values Lx' into the limited likelihood values Lx, using a function CF, for which a limited likelihood value Lx is defined by the derived likelihood value Lx' and the predetermined phase slip probability Ps. In even other words, the step of limiting the derived likelihood values Lx' includes limiting the amplitude of these derived likelihood values Lx' to a predetermined range of values, wherein this range of values has a predetermined upper limit UL and a predetermined lower limit LL. These predetermined limits depend on a predetermined phase slip probability Ps.

As an alternative solution, the likelihood values Lx' may be limited to a range of values by a linear saturation function CFA, that approximates the function CF and that has the upper and lower limits UL and LL.

As an even further alternative solution, the function CF or the linear saturation function CFA may be approximated by a quantized look-up table that maps the likelihood values Lx' onto likelihood values Lx within quantization intervals.

The above described alternatives for limiting the likelihood values Lx' may be performed within the limitation step LS shown in FIG. 1.

The value that is used as the phase slip probability Ps does not have to be the exact probability of a phase slip occurring on the actual optical channel that is used. The proposed method achieves a reduction of transmission errors even if a value is used that is only an approximation of the actual phase slip probability of the optical transmission channel. Thus, it is sufficient to use a provided or predefined value as the phase slip probability. This value may be stored in a memory device of the receiving device, or alternatively this value is set by an operator configuring the receiving device.

The limitation of the likelihood values Lx' has the advantage that this accounts for the possibility of a phase slip occurrence. A phase slip, as shown in the FIGS. 2c and 2d, may lead to a change of the sign for the likelihood value Lxd' of the corresponding differentially encoded and FEC encoded data value xd. If such a likelihood value Lxd' is used within the estimation algorithm EA, shown in FIG. 1, this may also lead to a likelihood value Lx' with a false sign. If a likelihood value Lx' with a false sign is later on used in the step of FEC decoding FECD without any limitation, then this unlimited likelihood value Lx' with a false sign may have a false increased impact onto the FEC decoding algorithm. This may lead the FEC decoding algorithm to a false FEC decoding for deriving the information data values iv'. But, by limiting the likelihood values Lx' to the likelihood values Lx and then using the limited likelihood values Lx in the FEC decoding step FECD, the impact of a phase slip onto the FEC decoding algorithm is reduced to certain degree. This in turn helps to improve the FEC error correction performance an thus to reduce the number of errors occurring in the FEC decoded information data values iv'.

For performing FEC encoding and decoding, different alternatives of a FEC code, for which information data values iv' may be derived from likelihood values Lx, may be used.

A first alternative of an FEC code is a Low-Density-Parity-Check (LDPC) Code. A detailed description for deriving information data values iv' from likelihood values Lx using a LDPC code can be found in "Frank R. Kschischang, Brendan J. Frey, Hans-Andrea Loeliger, '*Factor graphs and the sum-product algorithm*', IEEE TRANSACTIONS ON INFORMATION THEORY, VOL. 47, NO. 2, February 2001". Using the algorithm described in this reference, it is furthermore possible to determine updated likelihood values for FEC encoded data values from the likelihood values Lx, in the case that the FEC code is a LDPC code.

A second alternative of an FEC code is a Turbo Code. A detailed description for deriving information data values iv' from likelihood values Lx using a Turbo code can be found in "J. Hagenauer, E. Offer, L. Papke, '*Iterative Decoding of Binary Block and Convolutional Codes*', IEEE TRANSACTIONS ON INFORMATION THEORY, Vol. 42, No. 2, March 1996". Using the algorithm described in this reference, it is furthermore possible to determine updated likelihood values for FEC encoded data values from the likelihood values Lx, in the case that the FEC code is a Turbo code.

A third alternative an FEC code is a Convolutional Code. A detailed description for deriving information data values iv' from likelihood values Lx using a Convolutional code can be found in "S. Benedetto, D. Divsalar, G. Montorsi, F. Pollara, '*A Soft-Input Soft-Output APP Module for Iterative Decoding of Concatenated Codes*', IEEE COMMUNICATIONS LETTERS, VOL. 1, NO. 1, January 1997". Using the algorithm described in this reference, it is furthermore possible to determine updated likelihood values for FEC encoded data values from the likelihood values Lx, in the case that the FEC code is a Convolutional code.

Figure 8:
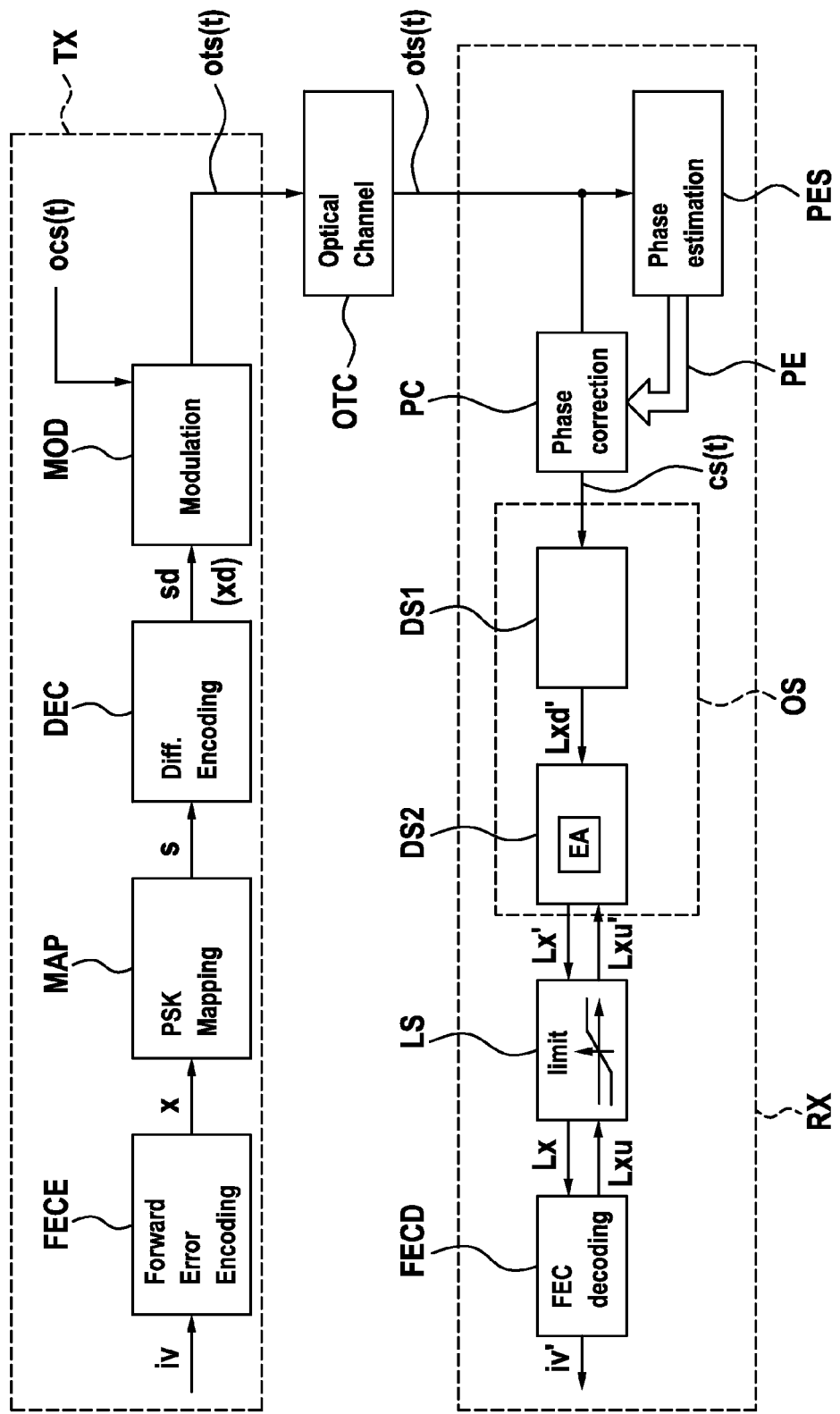
FIG. 8 shows diagrams of a transmission device and a receiving device according to a further embodiment.

FIG. 8 shows the same steps carried out at a transmitter TX and a receiver RX as already explained in detail with reference to FIG. 1. Furthermore, FIG. 8 shows updated likelihood values Lxu for the corresponding FEC encoded data values x, that are determined by the FEC decoding algorithm used in the FEC decoding step FECD and then passed back from the step to the limitation step LS.

Furthermore, FIG. 8 shows limited updated likelihood values Lxu' for the corresponding FEC encoded data values x, that are derived in a limitation step LS from the likelihood values Lxu and then passed back to the estimation algorithm EA of the derivation step DS2. The limited updated likelihood values Lxu' are derived from the updated likelihood values Lxu, using one of the alternatives for limiting likelihood values as described previously in detail with regard to FIG. 7. In detail, the function defining the relationship between the updated likelihood values Lxu and the limited updated likelihood values Lxu' may be chosen as $$Lxu' = \ln\left(\frac{(1-P_S)e^{Lxu} + P_S}{P_S e^{Lxu} + (1-P_S)}\right).$$

This function has the same characteristic curve CF, as shown in FIG. 7, when placing the updated likelihood valued Lxu at the x-axis and placing the updated limited likelihood values Lxu' at the y-axis, and when choosing the phase slip probability as Ps=1e−2. Thus, when using the above mentioned function for deriving from the updated likelihood values Lxu the limited updated likelihood values Lxu', this includes a limitation of the updated likelihood values Lxu to a range of values with an upper limit UL and a lower limit LL. The upper limit UL and the lower limit LL depend on a predetermined phase slip probability Ps. The limits UL and LL have absolute values that are equal to a likelihood value L_slip of the phase slip event. This value is $$L_{SLIP} = \ln\left(\frac{(1-P_S)}{P_S}\right).$$

As an alternative solution, the updated likelihood values Lxu may be limited to a range of values by a linear saturation function, that approximates the function CF and that has the output limits UL and LL.

As an even further alternative solution, the function CF or the linear saturation function CFA may be approximated by a quantized look-up table that maps the likelihood values Lx' onto likelihood values Lx within quantization intervals.

For each time instance t, a limited likelihood value Lxu'(t) for a corresponding differentially decoded but FEC encoded data value x is derived. The derived limited likelihood values Lxu' are used to update transition probabilities of the estimation algorithm EA, as it will be described now in detail.

Figure 5B:
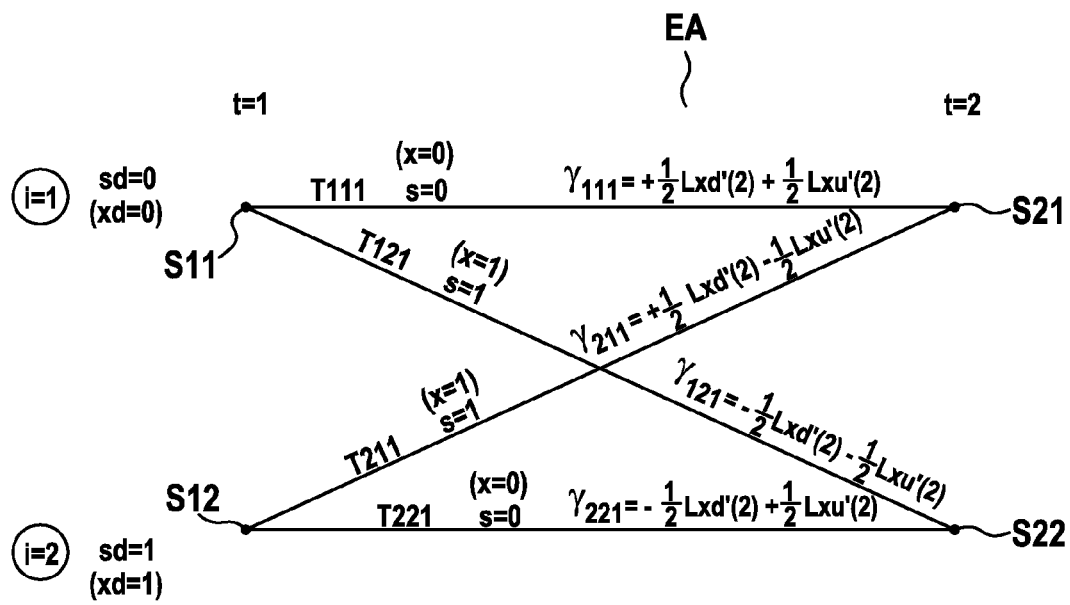
FIG. 5b shows the states and the state transitions of the estimation algorithm with updated transition probabilities.

FIG. 5b shows the estimation algorithm EA with the same states and transitions for the time instances t=1 and t=1, as already shown in FIG. 5a. The transition probabilities $\gamma_{111}, \ldots, \gamma_{221}$ are updated using the derived likelihood value Lxu'(t=2).

Since the transition probability $\gamma_{111}$ is related to a FEC encoded data value x=0, the transition probability $\gamma_{111}$ is updated by the likelihood value Lxu'(t=2) multiplied by a factor of +½.

Since the transition probability $\gamma_{211}$ is related to a FEC encoded data value x=1, the transition probability $\gamma_{211}$ is updated by the likelihood value Lxu'(t=2) multiplied by a factor of −½.

Since the transition probability $\gamma_{121}$ is related to a FEC encoded data value x=1, the transition probability $\gamma_{121}$ is updated by the likelihood value Lxu'(t=2) multiplied by a factor of −½.

Since the transition probability $\gamma_{221}$ is related to a FEC encoded data value x=0, the transition probability $\gamma_{221}$ is updated by the likelihood value Lxu'(t=2) multiplied by a factor of +½.

An update of transition probabilities for further time instances can be carried out in an analogue way using the likelihood values Lxu' of further time instances.

Coming back to FIG. 8, using the updated transition probabilities, the estimation algorithm EA can be used for deriving new likelihood values Lx' for the differentially decoded but FEC encoded data values. These new likelihood values Lx' are then limited in the limitation step for deriving new limited likelihood values Lx. These new limited likelihood values Lx may then be used
- to either derive new updated likelihood values Lxu and furthermore new updated limited likelihood values Lxu', which then may be used in a further iteration step of deriving likelihood values Lx' for differentially decoded but FEC encoded data values xd,
- or to derive FEC decoded information data values iv', using the FEC decoding algorithm of the FEC decoding step.

To summarize the above, FEC decoded information data values iv' are derived in an iterative method from the corrected signal cs(t), by
- deriving from the corrected signal cs(t) respective likelihood values Lx' for the FEC encoded data values x, using an estimation algorithm which accounts for a differential encoding rule used for differentially encoding the differentially encoded phase-shift keying modulated optical signal ots(t),
- limiting the derived likelihood values Lx' to a predetermined range of values,
- deriving from the limited likelihood values Lx updated likelihood values Lxu, using an algorithm which accounts for a FEC encoding rule used for FEC encoding of said FEC encoded data values,
- limiting the updated likelihood values Lxu to a predetermined range of values,
- deriving from the corrected signal cs(t) respective new likelihood values Lx' for the FEC encoded data values x, using the limited updated likelihood values Lxu' and an estimation algorithm which accounts for a differential encoding rule used for differentially encoding the differentially encoded phase-shift keying modulated optical signal ots(t),
- limiting the new likelihood values Lx' to a predetermined range of values,
- and deriving from the new limited likelihood values Lx FEC decoded data values iv', using an algorithm which accounts for a FEC encoding rule used for FEC encoding of said FEC encoded data values.

The previously mentioned steps may be iteratively used throughout a number of iterations.

It has been described in detail with regard to the FIGS. 6a, 6b and 7, in which way the effect of a phase slip can be modelled by means of an additive value representing data value inversion caused by a phase slip for the example of BPSK. Furthermore, it has been described in detail, in which way this model can be used to derive a range of values, to which likelihood values of differentially decoded data values should be limited.

It will now be explained with regard to the FIGS. 9a, 9b and 9c, which kind of a phase slip model can be used for the case of QPSK, in order to derive a range of values, to which likelihood values of differentially decoded data values should be limited. Such likelihood values, shown in the FIGS. 1 and 8 as the values Lx', of differentially decoded data values have to be derived from the corrected signal, shown in the FIGS. 1 and 8 as cs(t), within a derivation step, shown in the FIGS. 1 and 8 as the step DS. This derivation of the likelihood values of differentially decoded data values will be explained later on with regard to the FIGS. 12 and 13.

Figure 9A:
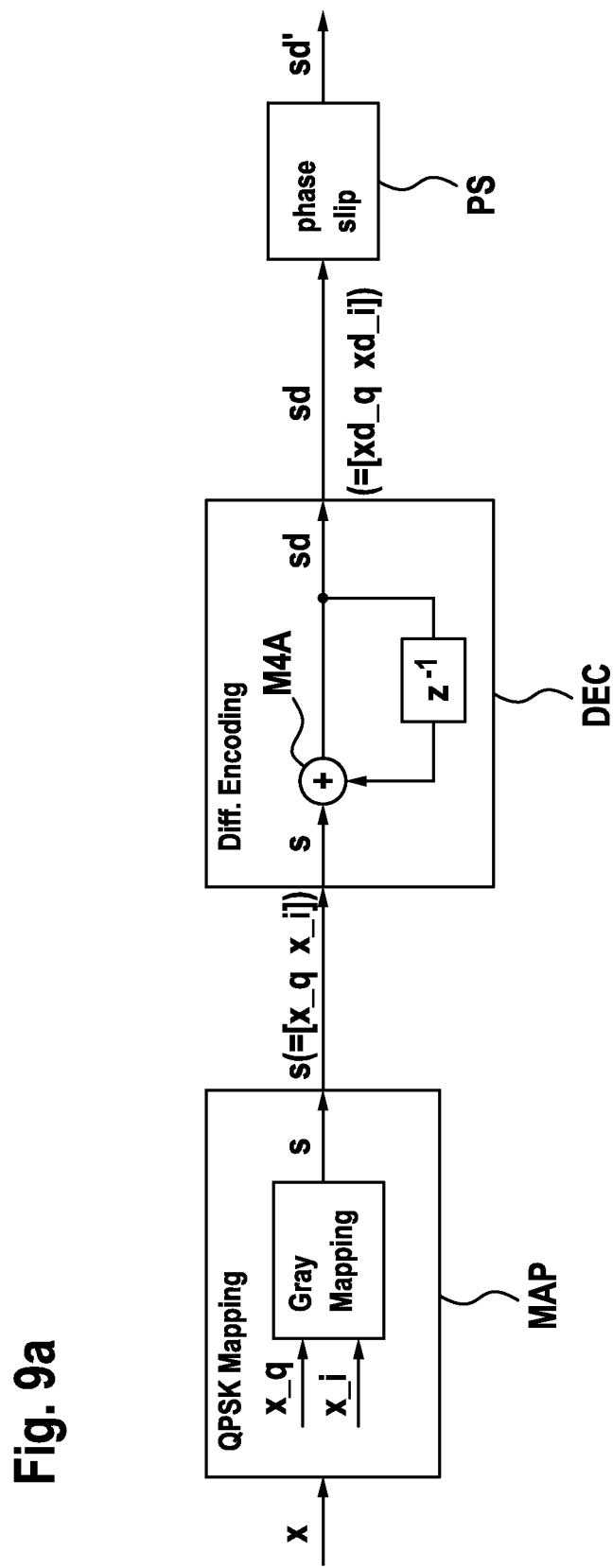
FIG. 9a shows a block diagram modelling the effect of a phase slip for QPSK.

FIG. 9a shows the step MAP of mapping FEC encoded data values x onto data symbols s, as already shown in FIGS. 1 and 8. For QPSK, this step MAP of mapping performs a mapping of two consecutive FEC encoded data values, x_q and x_i, onto a data symbol s, such that the data symbol s represents the sequence s=[x_q x_i] of the FEC encoded data values x_q, x_i.

Figures 10, 11:
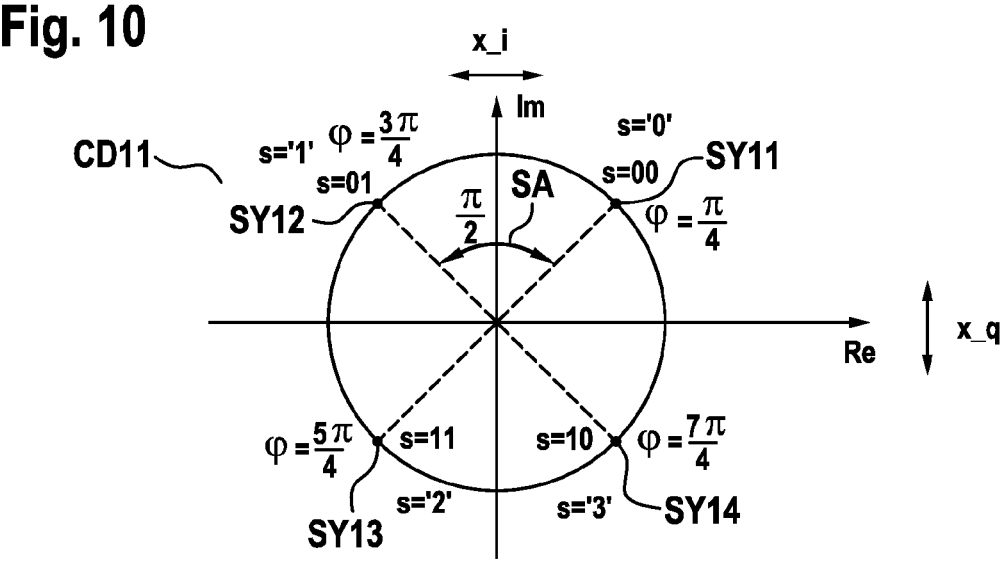
FIG. 10 shows a constellation diagram for QPSK.
FIG. 11 shows a table with values of a modulo-4 addition.

The mapping is performed by a gray mapping, that is explained in detail with regard to FIG. 10. FIG. 10 shows a constellation diagram CD1, which has four constellation points SY11, SY12, SY13, SY14. The constellation diagram CD1 is an example. A further example would be a constellation diagram the is rotated by an arbitrary whole numbered multiple of the separation angle and/or horizontally or vertically flipped.

The constellation point SY11 represents a data symbol s=[x_q x_i]=[0 0], which is chosen to be equivalent to the value '0'. The constellation point SY12 represents a data symbol s=[x_q x_i]=[0 1], which is chosen to be equivalent to the value '1'. The constellation point SY13 represents a data symbol s=[x_q x_i]=[1 1], which is chosen to be equivalent to the value '2'. The constellation point SY14 represents a data symbol s=[x_q x_i]=[0 0], which is chosen to be equivalent to the value '3'. The advantage of choosing this gray mapping will be described later on.

For QPSK, the separation angle is $\pi/2$, which means that phase slips by whole numbered multiples $N\cdot\pi/2$ of the separation angle with N=0, . . . 3 are possible.

Coming back to FIG. 9a, the data symbols s are differentially encoded in the step DEC, which yields the differentially encoded data symbols sd. The transfer function TF used for this differential encoding is given in the z-domain as $$H_{ENC}(z) = \frac{1}{1-z^{-1}}.$$

Thus, the derived differentially encoded data symbols sd(m) satisfy the equation $$sd(m)=s(m)\oplus sd(m-1),$$

wherein, for the case of QPSK, the addition $\oplus$ indicates a modulo-4 addition M4A. The differentially encoded data symbols sd may then be subject to a phase slip PS, causing an inversion of one or more differentially encoded data values xd_q, xd_i, which are represented by the differentially encoded data symbol as sd=[ xd_q xd_i].

Due to the gray mapping explained previously, the modulo-4 addition of two data symbols s_A and s_B is performed according to an addition rule as illustrated by the table shown in FIG. 11.

Figure 9B:
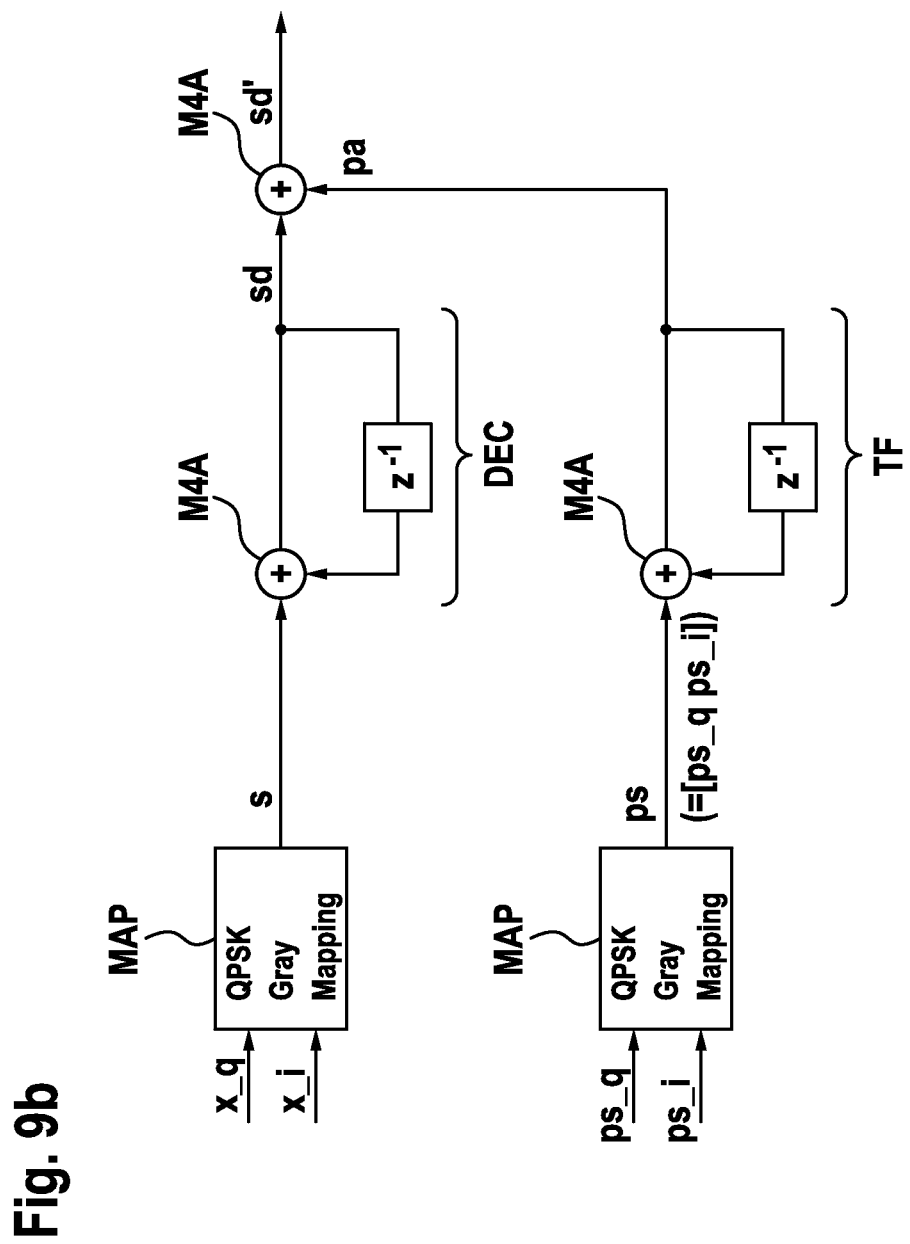
FIG. 9b shows a block diagram modelling the effect of a phase slip in an alternative way for QPSK.

FIG. 9b shows an alternative model for modelling the effect of a phase slip. The inversion of the differentially encoded data values xd_q, xd_i, caused by a phase slip, is modelled as an additive quantity pa, which is added to the differentially encoded data symbol sd by the previously explained modulo-4 addition. The additive quantity pa itself is modelled, by mapping two data values ps_q and ps_i onto a quantity ps=[ps_q p_si], using QPSK gray mapping, and filtering the quantity ps by a digital filter with the transfer function TF as $$H_{TF}(z) = \frac{1}{1-z^{-1}}.$$

This digital filter performs a modulo-4 addition M4A as previously explained.

The data values ps_q and ps_i themselves are considered as variables, each of which takes on the value '1' with a probability that is equal to the phase slip probability Ps, and each of which takes on the value '0' with the probability of (1−Ps). This makes use of an underlying phase slip model, which assumes that
- a phase slip with a rotation by ±π occurs with a probability of P_s$^2$,
- no phase slip with no rotation occurs with a probability of (1−P_s)$^2$
- and a phase slip with a rotation by ±π/2 occurs with a probability of P_s·(1−P_s).

Figure 9C:
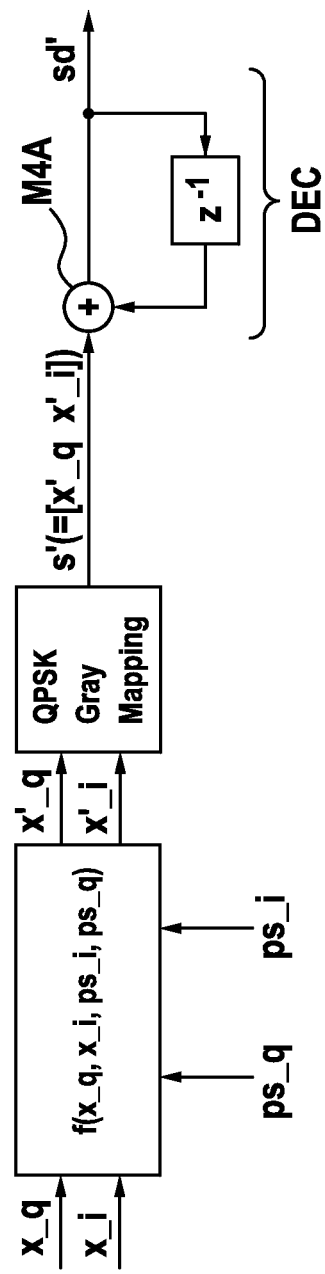
FIG. 9c shows another block diagram modelling the effect of a phase slip in an alternative way for QPSK.

FIG. 9c shows an equivalent model to the model of FIG. 9b. Since the transfer function TF is equal to the transfer function of the digital filter used for differential encoding DEC, it is possible to model the effect of a phase slip, by deriving modified data values x'_q and x'_i from the actual data values x_q and x_i and the data values ps_q and ps_i. The modified data values x'_q and x'_i are then mapped via the mentioned QPSK gray mapping onto data symbols s'=[x'q_x'_i]. Then, the symbols s'=[x'q_x'_i] are differentially encoded in a step DEC of differential encoding.

In order to satisfy the equivalence between the FIGS. 9b and 9c, the derived modified data values x'_q and x'_i have to be expressed as $$x'_I = x_I \oplus ps_I \oplus AND(x_I \oplus x_Q, ps_I \oplus ps_Q),$$

$$x'_Q = x_Q \oplus ps_Q \oplus AND(x_I \oplus x_Q, ps_I \oplus ps_Q).$$

Therefore, a relationship between the likelihood values Lx'_i, corresponding to the data values x'_i, and the likelihood values Lx_i, corresponding to the data values x_i, can be derived as follows $$Lx'_i(x'_i) = \ln\left(\frac{P(x'_i = 0)}{P(x'_i = 1)}\right)$$

$$= \ln\left(\frac{1 - P(x'_i = 1)}{P(x'_i = 1)}\right)$$

$$= \ln\left(\frac{(1-P_S)^2(1-P(x_i = 1)) + P_S^2 P(x_i = 1) + P_S(1-P_S)P(x_q = 1) + P_S(1-P_S)(1-P(x_q = 1))}{(1-P_S)^2 P(x_i = 1) + P_S^2(1-P(x_i = 1)) + P_S(1-P_S)(1-P(x_q = 1)) + P_S(1-P_S)P(x_q = 1)}\right)$$

$$= \ln\left(\frac{(1-P_S) - (1-2P_S)P(x_i = 1)}{P_S + (1-2P_S)P(x_i = 1)}\right)$$

$$= \ln\left(\frac{(1-P_S)(1 - P(x_i = 1)) + P_S P(x_i = 1)}{(1-P_S)P(x_i = 1) + P_S(1 - P(x_i = 1))}\right)$$

$$= \ln\left(\frac{(1-P_S)e^{Lx_i(x_i)} + P_S}{(1-P_S) + P_S e^{Lx_i(x_i)}}\right)$$

Furthermore, a relationship between the likelihood values Lx'_q, corresponding to the data values x'_q, and the likelihood values Lx_q, corresponding to the data values x_q, can be derived as $$Lx'_q(x'_q) = \ln\left(\frac{P(x'_q = 0)}{P(x'_q = 1)}\right)$$

$$= \ln\left(\frac{1 - P(x' = 1)}{P(x'_q = 1)}\right)$$

$$= \ln\left(\frac{(1-P_S)e^{Lx_q(x_q)} + P_S}{(1-P_S) + P_S e^{Lx_q(x_q)}}\right)$$

The advantage of choosing the previously mentioned QPSK gray mapping is that the likelihood values Lx'_i depend only on the likelihood values Lx_i and that the likelihood values Lx'_q depend only on the likelihood values Lx_q.

Furthermore, a relationship between the likelihood values Lx_i, corresponding to the data values x_i, and the likelihood values Lx'_i, corresponding to the data values x_'i, can be derived as $$Lx_i(x_i) = \ln\left(\frac{(1-P_S)e^{Lx'_i(x'_i)} + P_S}{(1-P_S) + P_S e^{Lx'_i(x'_i)}}\right),$$

and a relationship between the likelihood values Lx_q, corresponding to the data values x_q, and the likelihood values Lx'_q, corresponding to the data values x_'q, can be derived as $$Lx_q(x_q) = \ln\left(\frac{(1-P_S)e^{Lx'_q(x'_q)} + P_S}{(1-P_S) + P_S e^{Lx'_q(x'_q)}}\right).$$

The advantage of choosing the previously mentioned QPSK gray mapping is that the likelihood values Lx_i depend only on the likelihood values Lx'_i and that the likelihood values Lx_q depend only on the likelihood values Lx'_q.

The above described functions for the relationships between the different likelihood values have the same characteristic curves as the curve CF shown in FIG. 7.

The above described functions for the relationships between the different likelihood values have in common, that they have an upper limit value UL that depends only on the phase slip probability Ps as $$UL = \ln\left(\frac{(1-P_S)}{P_S}\right),$$

and a lower limit value LL that depends only on the phase slip probability Ps as $$LL = -\ln\left(\frac{(1-P_S)}{P_S}\right).$$

Thus, when using the above described functions for deriving from the likelihood values Lx'_q,i the likelihood values Lx_q,i, this includes a limitation of the derived likelihood values to a range of values with an upper limit UL and a lower limit LL. The upper limit UL and the lower limit LL depend on a predetermined phase slip probability Ps. The limits UL and LL have absolute values that are equal to a likelihood value L_slip of the phase slip event defined by the phase slip probability. This likelihood value is $$L_{SLIP} = \ln\left(\frac{(1-P_S)}{P_S}\right).$$

As an alternative solution, the likelihood values Lx'_q,i may be limited to a range of values by a linear saturation function, such as the function CFA shown in FIG. 7, that approximates the above described function and that has the output limits UL and LL.

As an even further alternative solution, the function CF or the linear saturation function CFA of FIG. 7 may be approximated by a quantized look-up table that maps the likelihood values Lx'_q,i onto likelihood values Lx_q,i within quantization intervals.

The above described alternatives for limiting the likelihood values Lx' may be performed within the limitation step LS shown in the FIGS. 1 and 8.

Figure 12:
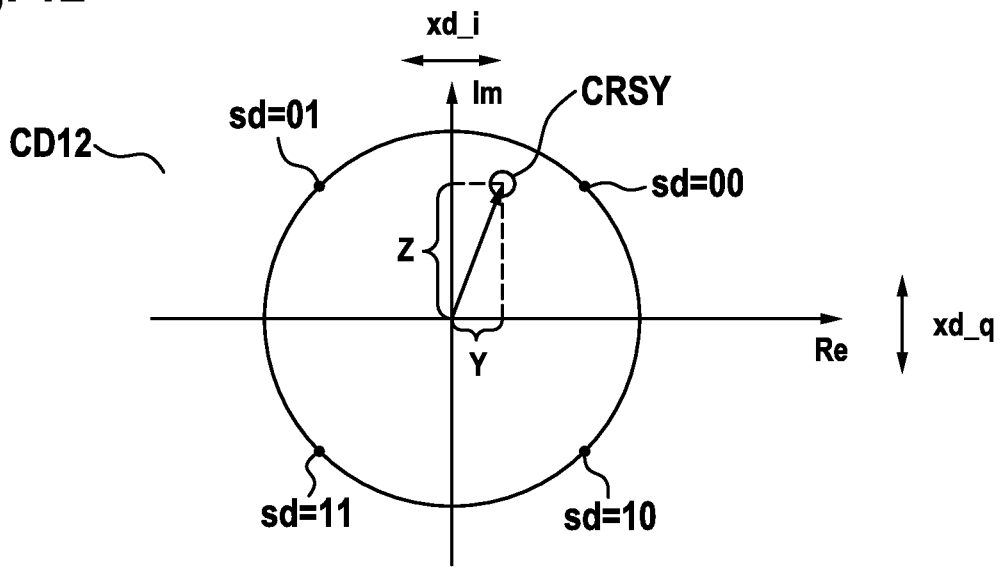
FIG. 12 shows a constellation diagram for QPSK together with amplitudes used for deriving likelihood values.

FIG. 12 shows the constellation diagram CD12 with constellation points of differentially encoded data symbols sd= [xd_q xd_i] together with a corrected received differentially encoded data symbol CRSY. It will now be explained, in which way for each of the differentially encoded data values xd_q and xd_i, a separate likelihood value Lxd'_q, Lxd'_i is derived as a value indicating the probability whether the data value xd_q, xd_i of the corrected received differentially encoded data symbol CRSY is a '1' or a '0'. Such a derivation of likelihood values Lxd'_q, Lxd'_i may be carried out within the derivation sub-step DS1, shown in the FIGS. 1 and 8.

The likelihood value Lxd'_q of the data value xd_q is derived, by taking the amplitude z of the corrected received differentially encoded data symbol CRSY on the imaginary axis Im, and setting the likelihood value Lxd'_q to $$Lxd'_q = \frac{2}{\sigma_N^2} z.$$

The likelihood value Lxd'_i of the data value xd_i is derived, by taking the amplitude y of the corrected received differentially encoded data symbol CRSY on the real axis Re, and setting the likelihood value Lxd'_i to $$Lxd'_i = \frac{2}{\sigma_N^2} y.$$

Figure 13:
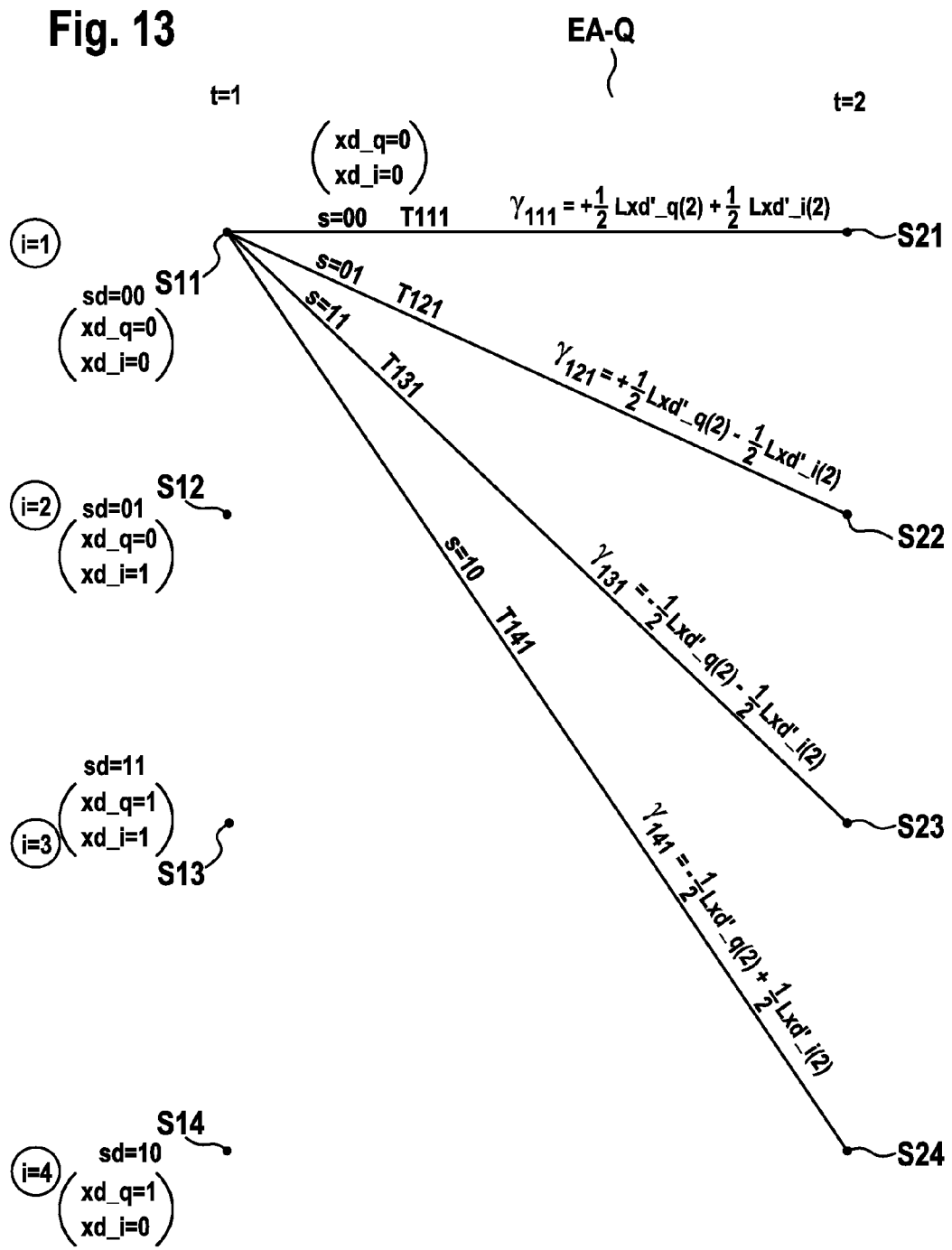
FIG. 13 shows states and state transitions of an estimation algorithm for QPSK.

The derived likelihood values Lxd'_q, Lxd'_i of the differentially encoded and FEC encoded data values xd_q, xd_i may then be used in a derivation sub-step DS2, shown in the FIGS. 1 and 8, for deriving likelihood values Lx'_q and Lx'_i of the corresponding differentially decoded but FEC encoded data values x_q and x_i, as now explained in detail with regard to the FIG. 13.

FIG. 13 shows for an estimation algorithm EA-Q, which may be used for deriving from likelihood values Lxd'_q, Lxd'_i, of differentially encoded and FEC encoded data values xd_q, xd_i, likelihood values Lx'_q, Lx'_i, of differentially decoded but FEC encoded data values x_q, x_i, when using QPSK.

The estimation algorithm EA-Q stipulates for each time instance with the index t different states Sti, wherein i is the state index. The state index values i=1, 2, 3, 4 are indicated on the left hand side of the estimation algorithm EA-Q.

The estimation algorithm EA-Q stipulates for a time instance t with the index t=1 a hypothetical state S11, which represents a potentially transmitted differentially encoded data symbol sd(t=1)=00, which is for QPSK equal to a sequence of differentially encoded and FEC encoded data values as sd(t=1)=[xd_q xd_i]=[0 0], as previously outlined. Further states S12, S13, S14 representing the differentially encoded data symbols sd(t=1)={01, 11, 10} are also stipulated. The algorithm EA stipulates for a time instance t with the index t=2 hypothetical states S21, S22, S23, S24 representing the differentially encoded data symbols sd(t=2)={00, 01, 11, 10}.

Furthermore, transitions T111, . . . , T141 are stipulated. A transition Tijt has an index ijt, which indicates the i-th state from which the transition starts, the j-th state to which the transition leads, and the time index t, at which the transition starts.

Furthermore, with each transition T111, . . . , T141 a corresponding differentially decoded data symbol s(t=2)= {00, 01, 11, 10} is associated. As previously outlined, a differentially decoded data symbol s(t=2) represents a sequence of differentially decoded but FEC encoded data values as s(t=1)=[x_q x_i].

For the transitions T111, . . . , T141, respective transition probabilities $\gamma_{111}, \ldots, \gamma_{141}$ are derived, using the likelihood values Lxd'_q, Lxd'_i. In this example, the transition probabilities $\gamma_{111}, \ldots, \gamma_{141}$ are given in the logarithmic domain; this does not necessarily have to be the case, they might instead be given in the linear domain. The transition probabilities $\gamma_{111}, \ldots, \gamma_{141}$ are initialized using the derived likelihood values Lxd'_q, Lxd'_i. For normalization reasons, a likelihood value Lxd'_q, Lxd'_i may be multiplied by a normalization factor ½.

The likelihood value Lxd'_q(t=2) for the differentially encoded data value xd_q is derived from the optical signal at the time t=2 and indicates a probability, whether a corresponding differentially encoded data value xd_q(t=2) is equal to '0' or equal to '1'. If the probability is high that the differentially encoded data value xd_q(t=2) is equal to '1', then the value Lxd'_q(t=2) takes on large negative values. If the probability is high that the differentially encoded data value xd__1 (t) is equal to '0', then the value Lxd'_q(t=2) takes on large positive values. Therefore, if a state transition $\gamma_{111}, \ldots, \gamma_{141}$ leads to a state S11, . . . , S14 for which the corresponding differentially encoded data value xd_q(t=2) is equal to '0', then the likelihood value Lxd'_q(t=2) multiplied by +½ is added to that state transition $\gamma_{111}, \ldots, \gamma_{141}$. If a state transition $\gamma_{111}, \ldots, \gamma_{141}$ leads to a state S11, . . . , S14 for which the corresponding differentially encoded data value xd_q(t=2) is equal to '1', then the likelihood value Lxd'_q(t=2) multiplied by −½ is added to that state transition $\gamma_{111}, \ldots, \gamma_{141}$.

The likelihood value Lxd'_i(t=2) for the differentially encoded data value xd_i is derived from the optical signal at the time t=2 and indicates a probability, whether a corresponding differentially encoded data value xd_i(t=2) is equal to '0' or equal to '1'. If the probability is high that the differentially encoded data value xd_i(t=2) is equal to '1', then the value Lxd'_i(t=2) takes on large negative values. If the probability is high that the differentially encoded data value xd_i(t) is equal to '0', then the value Lxd'_i(t=2) takes on large positive values. Therefore, if a state transition $\gamma_{111}, \ldots, \gamma_{141}$ leads to a state S11, . . . , S14 for which the corresponding differentially encoded data value xd_i(t=2) is equal to '0', then the likelihood value Lxd'_i(t=2) multiplied by +½ is added to that state transition $\gamma_{111}, \ldots, \gamma_{141}$. If a state transition $\gamma_{111}, \ldots, \gamma_{141}$ leads to a state S11, . . . , S14 for which the corresponding differentially encoded data value xd_i(t=2) is equal to '01', then the likelihood value Lxd'_i(t=2) multiplied by −½ is added to that state transition $\gamma_{111}, \ldots, \gamma_{141}$.

Further transition probabilities of further state transitions not shown between the states S11, . . . , S14 and the states S21, . . . , S24 may be determined in an analogue way using the likelihood values Lxd'_q(t=2) and Lxd'_i(t=2).

Further states representing differentially encoded data symbols may be stipulated for further time instances t=3, 4, . . . , which are not depicted in FIG. 13.

Using the stipulated states and the stipulated transition probabilities, the algorithm EA-Q can be used for deriving from the likelihood values Lxd'_q, Lxd'_i of the differentially encoded and FEC encoded data values xd_q, xd_i the likelihood values Lx'_q, Lx'_i of the differentially decoded but FEC encoded data values x_q, x_i. For this derivation, the above mentioned BCJR Algorithm or the above mentioned Viterbi algorithm may be used.

The derived likelihood values Lx'_q, Lx'_i may then be limited in a limitation step, as previously described above, to yield limited likelihood values Lx_q, Lx_i. These limited likelihood values Lx_q, Lx_i may then be used
  to either derive FEC decoded information data values in a FEC decoding step FECD, as previously illustrated with regard to FIG. 1,
  or to derive updated likelihood values Lxu_q, Lxu_i, using an algorithm that accounts for the FEC encoding algorithm used for FEC encoding on the transmission side.

In the case, that updated likelihood values Lxu_q, Lxu_i are derived, these updated likelihood values Lxu_q, Lxu_i may then be limited, as previously described above, for deriving limited updated likelihood values Lxu'_q, Lxu'_i. The limited updated likelihood values Lxu'_q, Lxu'_i are then used for updating the transition probabilities of the estimation algorithm EA-Q, shown in FIG. 13, in a way that is analogue to the updating procedure previously described with regard to FIG. 5b. Using the updated transition probabilities, the estimation algorithm derives further new likelihood values Lx'_q, Lx'_i.

Figure 14:
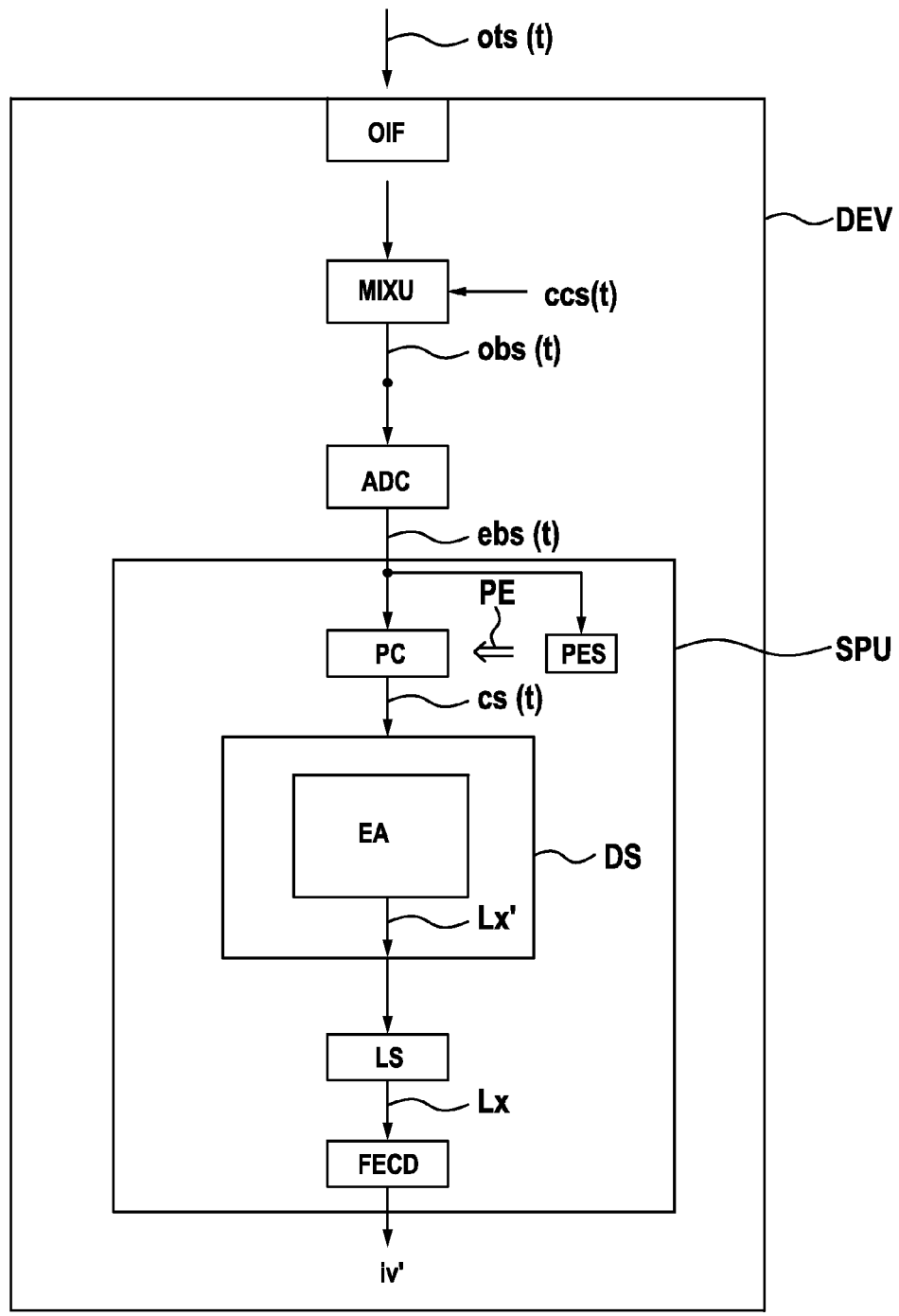
FIG. 14 shows a device for decoding optical data signals.

FIG. 14 shows a proposed device DEV for decoding optical data signals.

The device DEV contains an optical interface OIF, which is adapted to receive a differentially encoded phase-shift keying modulated optical signal ots(t). The optical interface OIF provides the received signal ots(t) to an optical mixing unit MIXU, which mixes the received signal ots(t) with a phase-coherent optical carrier signal ccs(t). The carrier signal ccs(t) possesses essentially the carrier frequency of an optical carrier signal used on a transmission side. The phase $\phi_{CS}$ of the optical phase-coherent carrier signal ccs(t) is equal to the phase $\phi_{OCS}$ of the optical carrier signal used at the transmitting side plus/minus a whole numbered multiple of the PSK separation angle $\phi_{SEP-PSK}$ and a phase offset $\Delta\phi$ as $$\phi_{CS} = \phi_{OCS} \pm N \cdot \phi_{SEP-PSK} + \Delta\phi, \text{ with } N=0,1,2,\ldots.$$

An optical baseband signal obs(t) results from the mixing of the received signal ots(t) with the phase-coherent carrier signal ccs(t). The optical baseband signal obs(t) is provided by the mixing unit MIXU to an analogue-digital conversion unit ADC.

The analogue-digital conversion unit ADC converts the optical baseband signal obs(t) into a time-discrete electrical baseband signal ebs(t), and provides the electrical baseband signal ebs(t) to a signal processing unit SPU.

In a phase estimation step PES, the signal processing unit SPU estimates from the electrical baseband signal ebs(t) a phase offset PE. The estimated phase offset PE is provided to a phase correction step PC.

In the phase correction step PC, the signal processing unit SPU changes the phase of the electrical baseband signal ebs(t) by the estimated phase offset PE. The result of this correction is a corrected electrical signal cs(t).

The corrected electrical signal cs(t) is provided to an estimation step DS. In the estimation step DS, likelihood values Lx' for FEC encoded data values are derived. For doing so, the estimation step DS uses an estimation algorithm EA.

The estimation algorithm EA accounts for a differential encoding rule used for differentially encoding the differentially encoded phase-shift keying modulated optical signal ots(t).

The derived likelihood values Lx' are limited in a limitation step LS to a predetermined range of values, which yields the limited likelihood values Lx. From the limited likelihood values Lx, the processing unit SPU derives FEC decoded information data values iv' in a FEC decoding step FECD, using an algorithm which accounts for a FEC encoding rule used for FEC encoding of the FEC encoded data values.

The device DEV is furthermore adapted to carry out further steps of one or more methods described with regard to the FIGS. 1 to 13. For calculation steps, the device DEV may rely on the signal processing unit SPU and/or on other units not explicitly shown in FIG. 14.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIG. 14, including any functional blocks labelled as "device", "unit" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processing unit", "device" or "unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. It should be appreciated by those skilled in the art that any block diagrams herein represent conceptual views of illustrative circuitry embodying the principles of the invention.

The invention claimed is:

1. A method of decoding a differentially encoded phase-shift keying modulated optical data signal carrying forward error correction (FEC) encoded data values, comprising:
   correcting the differentially encoded phase-shift keying modulated optical data signal by an estimated phase offset,
   deriving from a corrected differentially encoded phase-shift keying modulated optical data signal likelihood values for the FEC encoded data values using an estimation algorithm which accounts for a differential encoding rule used for differentially encoding the differentially encoded phase-shift keying modulated optical data signal,
   limiting derived likelihood values to a predetermined range of likelihood values, and
   deriving from the limited derived likelihood values FEC decoded data values using an algorithm which accounts for a FEC encoding rule used for FEC encoding of the FEC encoded data values.

2. The method according to claim 1, wherein the predetermined range of likelihood values has an upper limit and a lower limit, and wherein the upper limit and the lower limit depend on a predetermined phase slip probability.

3. The method according to claim 2, wherein the limiting the derived likelihood values includes transforming the derived likelihood values into the limited derived likelihood values using a function for which a limited likelihood value is defined by a derived likelihood value and the predetermined phase slip probability.

4. The method according to claim 1, further comprising coherent reception of the differentially encoded phase-shift keying modulated optical data signal by mixing the differentially encoded phase-shift keying modulated optical data signal with a local optical signal provided by a local oscillator.

5. The method according to claim 1, wherein a sign of a likelihood value indicates a value to which a FEC encoded data value is assumed to be equal to, and wherein an amplitude of the likelihood value indicates a likelihood of the FEC encoded data value being equal to an assumed value.

6. The method according to claim 1, wherein the estimation algorithm used for deriving the likelihood values for the FEC encoded data values uses a predetermined noise variance value.

7. A device for decoding a differentially encoded phase-shift keying modulated optical data signal carrying forward error correction (FEC) encoded data values, the device comprising:
   a phase correction circuit configured to correct the differentially encoded phase-shift keying modulated optical data signal by an estimated phase offset,
   a derivation circuit configured to derive from a corrected differentially encoded phase-shift keying modulated optical data signal likelihood values for the FEC encoded data values using an estimation algorithm which accounts for a differential encoding rule used for differentially encoding the differentially encoded phase-shift keying modulated optical data signal,
   a limit circuit configured to limit derived likelihood values to a predetermined range of values, and
   a FEC decoder circuit configured to derive from the limited derived likelihood values FEC decoded data values using an algorithm which accounts for a FEC encoding rule used for FEC encoding of the FEC encoded data values.

8. A method of decoding a differentially encoded phase-shift keying modulated optical data signal carrying forward error correction (FEC) encoded data values, comprising:
   correcting the differentially encoded phase-shift keying modulated optical data signal by an estimated phase offset,
   deriving from a corrected differentially encoded phase-shift keying modulated optical data signal likelihood values for the FEC encoded data values using an estimation algorithm which accounts for a differential encoding rule used for differentially encoding the differentially encoded phase-shift keying modulated optical data signal,
   limiting derived likelihood values to a predetermined range of likelihood values,
   deriving updated likelihood values from the limited derived likelihood values using an algorithm which accounts for a FEC encoding rule used for FEC encoding of the FEC encoded data values,
   limiting the updated likelihood values to the predetermined range of values,
   deriving from the corrected differentially encoded phase-shift keying modulated optical data signal new likelihood values for the FEC encoded data values using the limited updated likelihood values and the estimation algorithm which accounts for the differential encoding rule used for differentially encoding the differentially encoded phase-shift keying modulated optical data signal,
   limiting the new likelihood values to the predetermined range of values, and
   deriving from the new limited likelihood values FEC decoded data values using the algorithm which accounts for the FEC encoding rule used for the FEC encoding of the FEC encoded data values.

* * * * *